(12) United States Patent
Ramos et al.

(10) Patent No.: US 11,892,818 B2
(45) Date of Patent: Feb. 6, 2024

(54) DOCK DOOR AUTOMATION SYSTEMS AND METHODS

(71) Applicant: Niagara Bottling, LLC, Ontario, CA (US)

(72) Inventors: Luis Ramos, Ontario, CA (US); Alex Sigala, Ontario, CA (US); Ken Cooper, Irvine, CA (US); Sergio Falcon, Irvine, CA (US); Ken Cooper, IV, Irvine, CA (US)

(73) Assignee: Niagara Bottling, LLC, Diamond Bar, CA (US)

( * ) Notice: Subject to any disclaimer, the term of this patent is extended or adjusted under 35 U.S.C. 154(b) by 823 days.

(21) Appl. No.: 16/656,509

(22) Filed: Oct. 17, 2019

(65) Prior Publication Data

US 2020/0125074 A1  Apr. 23, 2020

Related U.S. Application Data

(60) Provisional application No. 62/782,243, filed on Dec. 19, 2018, provisional application No. 62/747,063, filed on Oct. 17, 2018.

(51) Int. Cl.
*G05B 19/41* (2006.01)
*G05B 19/4155* (2006.01)
(Continued)

(52) U.S. Cl.
CPC ....... *G05B 19/4155* (2013.01); *B65G 69/287* (2013.01); *E05F 15/73* (2015.01);
(Continued)

(58) Field of Classification Search
None
See application file for complete search history.

(56) References Cited

U.S. PATENT DOCUMENTS

| 3,138,812 A | 6/1964 | Prosser |
| 3,290,709 A | 2/1966 | Whitenack, Jr. et al. |

(Continued)

FOREIGN PATENT DOCUMENTS

| CA | 1146309 A | 5/1983 |
| DE | 3049611 A1 | 7/1982 |

(Continued)

OTHER PUBLICATIONS

"Redacted Proposal Dock Equipment Automation," Jul. 9, 2013, 10 pages.

(Continued)

*Primary Examiner* — K. Wong
(74) *Attorney, Agent, or Firm* — Michael Best & Friedrich LLP

(57) ABSTRACT

A system and method are provided for automated engaging of a truck trailer at a loading dock. Sensors measure a distance and an angle of alignment between the incoming trailer and a wall of the loading dock. An outside lighting system guides a truck driver backing the trailer toward the dock door. A vehicle restraint system fixates the trailer within the loading dock in response to signals from the sensors. An overhead dock door opens once the trailer is successfully fixated by the vehicle restraint system. A dock leveler deploys after the overhead dock door opens. An inside dock light indicates to dock personnel that the trailer is ready to be serviced. Once servicing of the trailer is finished, an automated release of the trailer from the loading dock may be initiated by PLC communication.

20 Claims, 14 Drawing Sheets

(51) Int. Cl.
*E05F 15/73* (2015.01)
*B65G 69/28* (2006.01)

(52) U.S. Cl.
CPC ... *E05F 2015/763* (2015.01); *E05F 2015/765* (2015.01); *E05Y 2900/132* (2013.01); *E05Y 2900/516* (2013.01); *G05B 2219/40062* (2013.01)

(56) References Cited

U.S. PATENT DOCUMENTS

| | | | |
|---|---|---|---|
| 3,290,710 | A | 12/1966 | Whitenack, Jr. |
| 3,599,262 | A | 8/1971 | Carder et al. |
| 4,146,888 | A | 3/1979 | Grunewald et al. |
| 4,279,050 | A | 7/1981 | Abbott |
| 4,692,755 | A | 9/1987 | Hahn |
| 4,727,613 | A | 3/1988 | Alten |
| 4,843,373 | A * | 6/1989 | Trickle ............ B65G 69/003 340/932.2 |
| 4,977,635 | A | 12/1990 | Alexander |
| 5,191,328 | A * | 3/1993 | Nelson ............ G01S 11/16 702/159 |
| 5,205,010 | A | 4/1993 | Hageman |
| 5,299,386 | A | 4/1994 | Naegelli et al. |
| 5,396,676 | A | 3/1995 | Alexander et al. |
| 5,440,772 | A | 8/1995 | Springer et al. |
| 5,453,735 | A | 9/1995 | Hahn |
| 5,586,355 | A | 12/1996 | Metz et al. |
| 5,774,920 | A | 7/1998 | Alexander |
| 5,803,701 | A | 9/1998 | Filiberti et al. |
| 5,826,291 | A | 10/1998 | Alexander |
| 5,831,540 | A | 11/1998 | Sullivan et al. |
| 5,881,780 | A | 3/1999 | Matye et al. |
| 6,147,625 | A | 11/2000 | Decker |
| 6,205,721 | B1 | 3/2001 | Ashelin et al. |
| 6,233,885 | B1 | 5/2001 | Hoffmann et al. |
| 6,311,352 | B1 | 11/2001 | Springer |
| 6,329,931 | B1 | 12/2001 | Gunton |
| 6,409,452 | B1 | 6/2002 | Zibella et al. |
| 6,499,169 | B2 | 12/2002 | Hahn et al. |
| 6,502,268 | B2 | 1/2003 | Ashelin et al. |
| 6,634,139 | B1 | 10/2003 | Metz |
| 6,651,581 | B2 | 11/2003 | Gauthier |
| 6,693,524 | B1 | 2/2004 | Payne |
| 6,781,516 | B2 | 8/2004 | Reynard et al. |
| 6,812,849 | B1 | 11/2004 | Ancel |
| 6,880,301 | B2 | 4/2005 | Hahn et al. |
| 6,896,469 | B2 | 5/2005 | Alexander |
| 6,975,226 | B2 | 12/2005 | Reynard et al. |
| 7,045,764 | B2 | 5/2006 | Beggs et al. |
| 7,165,486 | B2 | 1/2007 | Alexander et al. |
| 7,185,463 | B2 | 3/2007 | Borgerding |
| 7,213,285 | B2 | 5/2007 | Mitchell |
| 7,256,703 | B2 | 8/2007 | Duvernell et al. |
| 7,274,300 | B2 | 9/2007 | Duvernell et al. |
| 7,380,375 | B2 | 6/2008 | Maly et al. |
| 7,384,229 | B2 | 6/2008 | Gleason |
| 7,752,696 | B2 | 7/2010 | Grunewald et al. |
| 7,954,606 | B2 | 6/2011 | Tinone et al. |
| 8,065,770 | B2 | 11/2011 | Proffitt et al. |
| 8,307,588 | B2 | 11/2012 | Hoffmann et al. |
| 8,424,254 | B2 | 4/2013 | Ballester |
| 8,443,945 | B2 | 5/2013 | Perkins |
| 8,497,761 | B2 | 7/2013 | McNeill et al. |
| 8,499,897 | B2 | 8/2013 | Brooks et al. |
| 8,547,234 | B2 | 10/2013 | Maly et al. |
| 8,590,087 | B2 | 11/2013 | Swessel et al. |
| 8,596,949 | B2 | 12/2013 | Harrington |
| 8,616,826 | B2 | 12/2013 | Cotton et al. |
| 8,678,736 | B2 | 3/2014 | Anderson et al. |
| 8,733,034 | B2 | 5/2014 | Ballester |
| 8,789,850 | B2 | 7/2014 | Kimener et al. |
| 8,806,689 | B2 | 8/2014 | Riviere et al. |
| 8,838,279 | B2 | 9/2014 | Blackwell et al. |
| 8,890,475 | B1 | 11/2014 | Becker |
| 8,926,254 | B2 | 1/2015 | Pocobello et al. |
| 9,284,135 | B2 | 3/2016 | Sveum |
| 9,290,336 | B2 | 3/2016 | Ballester |
| 9,751,702 | B1 | 9/2017 | Hoofard et al. |
| 9,776,511 | B2 * | 10/2017 | Brooks ............ B60K 35/00 |
| 9,830,825 | B2 | 11/2017 | Anstett |
| 9,845,209 | B2 | 12/2017 | Brooks et al. |
| 9,926,148 | B2 | 3/2018 | Stone et al. |
| 9,938,020 | B2 | 4/2018 | Hochstein et al. |
| 9,950,881 | B2 | 4/2018 | Clifford et al. |
| 10,005,627 | B2 | 6/2018 | Bastian, II |
| 10,081,504 | B2 | 9/2018 | Walford et al. |
| 10,106,342 | B2 * | 10/2018 | Avalos ............ B60P 1/00 |
| 10,696,499 | B2 * | 6/2020 | Avalos ............ B65G 69/2882 |
| 10,744,943 | B1 | 8/2020 | Costa et al. |
| 11,009,604 | B1 | 5/2021 | Barish et al. |
| 11,430,104 | B2 | 8/2022 | Barish et al. |
| 11,511,952 | B2 * | 11/2022 | Avalos ............ B65G 69/003 |
| 2001/0052434 | A1 | 12/2001 | Ehrlich et al. |
| 2003/0145535 | A1 | 8/2003 | DiBiase et al. |
| 2004/0075046 | A1 | 4/2004 | Beggs et al. |
| 2004/0105579 | A1 | 6/2004 | Ishii et al. |
| 2005/0028723 | A1 | 2/2005 | Ancel |
| 2006/0051196 | A1 | 3/2006 | McDonald |
| 2006/0137261 | A1 | 6/2006 | Maly |
| 2006/0181391 | A1 | 8/2006 | McNeill et al. |
| 2006/0266275 | A1 | 11/2006 | DiBiase et al. |
| 2006/0267745 | A1 | 11/2006 | Larson |
| 2007/0248440 | A1 | 10/2007 | Andersen et al. |
| 2008/0010757 | A1 | 1/2008 | Hochstein et al. |
| 2008/0042865 | A1 | 2/2008 | Shepard et al. |
| 2008/0124203 | A1 | 5/2008 | McDonald |
| 2008/0127435 | A1 | 6/2008 | Maly et al. |
| 2008/0141470 | A1 | 6/2008 | Belongia |
| 2008/0223667 | A1 | 9/2008 | Tinone et al. |
| 2009/0274542 | A1 | 11/2009 | Pocobello et al. |
| 2010/0146719 | A1 | 6/2010 | Swessel et al. |
| 2010/0212170 | A1 | 8/2010 | Marsee |
| 2010/0269273 | A1 | 10/2010 | Proffitt et al. |
| 2011/0075441 | A1 | 3/2011 | Swessel et al. |
| 2011/0203059 | A1 | 8/2011 | Whitley et al. |
| 2011/0219632 | A1 | 9/2011 | Odom |
| 2012/0025964 | A1 | 2/2012 | Beggs et al. |
| 2013/0291455 | A1 | 11/2013 | Wiegel et al. |
| 2013/0320828 | A1 | 12/2013 | Nitzsche et al. |
| 2014/0186146 | A1 | 7/2014 | Alan |
| 2014/0309887 | A1 | 10/2014 | Lavoie |
| 2015/0009046 | A1 | 1/2015 | Senfleben et al. |
| 2015/0047132 | A1 | 2/2015 | Sveum et al. |
| 2015/0047133 | A1 | 2/2015 | Sveum |
| 2015/0375947 | A1 | 12/2015 | Hochstein et al. |
| 2016/0009177 | A1 | 1/2016 | Brooks et al. |
| 2016/0104364 | A1 | 4/2016 | Brooks et al. |
| 2017/0043967 | A1 | 2/2017 | Walford et al. |
| 2017/0341514 | A1 | 11/2017 | Brooks et al. |
| 2017/0341515 | A1 | 11/2017 | Brooks et al. |
| 2017/0341516 | A1 | 11/2017 | Brooks et al. |
| 2017/0368939 | A1 | 12/2017 | Brooks et al. |
| 2018/0031364 | A1 | 2/2018 | Kallay et al. |
| 2018/0040103 | A1 | 2/2018 | Garcia et al. |
| 2018/0346029 | A1 | 12/2018 | Kabos et al. |
| 2019/0002216 | A1 | 1/2019 | Walford et al. |
| 2019/0064835 | A1 | 2/2019 | Hoofard et al. |
| 2019/0188936 | A1 * | 6/2019 | Sivill ............ E05F 17/00 |
| 2019/0197318 | A1 | 6/2019 | Krishnamurthy et al. |
| 2019/0197716 | A1 | 6/2019 | Trajkovic et al. |
| 2020/0299077 | A1 | 9/2020 | Harres et al. |
| 2021/0042982 | A1 | 2/2021 | Trajkovic et al. |

FOREIGN PATENT DOCUMENTS

| | | |
|---|---|---|
| EP | 1317963 B1 | 6/2003 |
| EP | 2206664 A1 | 7/2010 |
| EP | 2360110 A1 | 8/2011 |
| EP | 2865622 A1 | 4/2015 |
| GB | 2144706 A | 3/1985 |
| WO | WO02070383 A1 | 9/2002 |
| WO | WO2008008699 A1 | 1/2008 |

(56) References Cited

FOREIGN PATENT DOCUMENTS

| WO | WO2009073001 |  | 6/2009 |
| WO | WO2010064989 | A1 | 6/2010 |
| WO | WO2015166339 | A1 | 11/2015 |

OTHER PUBLICATIONS

Crawford, "Crawford Docking Equipment Product Datasheet," last retrieved from [http://www.crawfordsolutions.com.sa/AAES/crawfordsolutionsCOM/EN/Products/Docking/Dock%20levellers/Docking%20equipmenl/1. %20Product% 20datasheel/PD_DEQP_ALL_EN_ORG.pdf] on Jun. 16, 2015, 16 pages.

Carlo et al., "II., Real-Time Dock Door Monitoring System Using a Kinect Sensor", dated Jan. 1, 2014, URL: https://www.mhi.org/downloads/learning /cicmhe/colloquium/2014/02-Carlo-%20paper.pdf, (10 Pages).

Application note—Leddar For Loading Dock Vehicle positioning Sensor; Date Sep. 2013; pulled from leddartech.com on Nov. 8, 2017.

\* cited by examiner

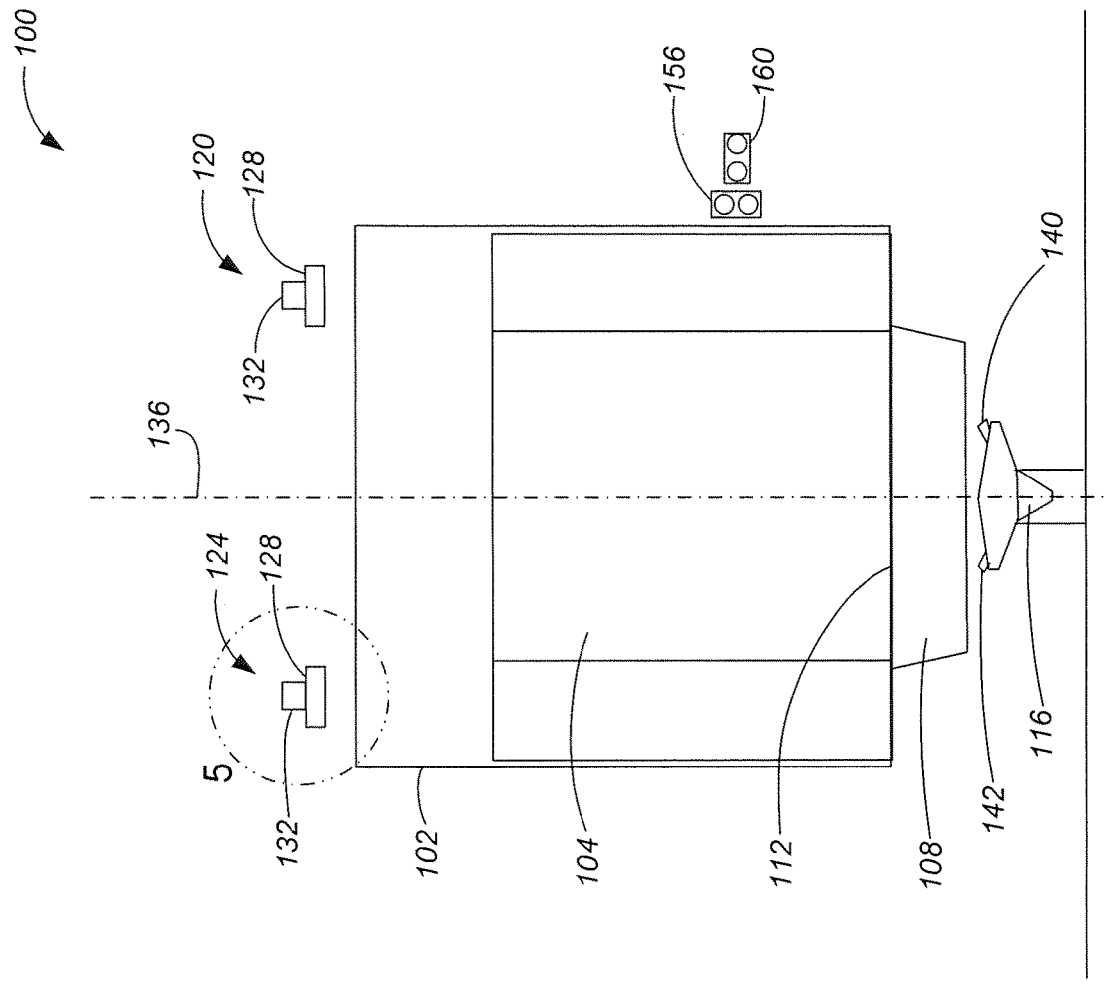
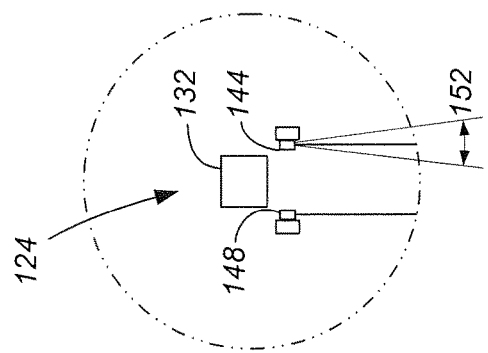

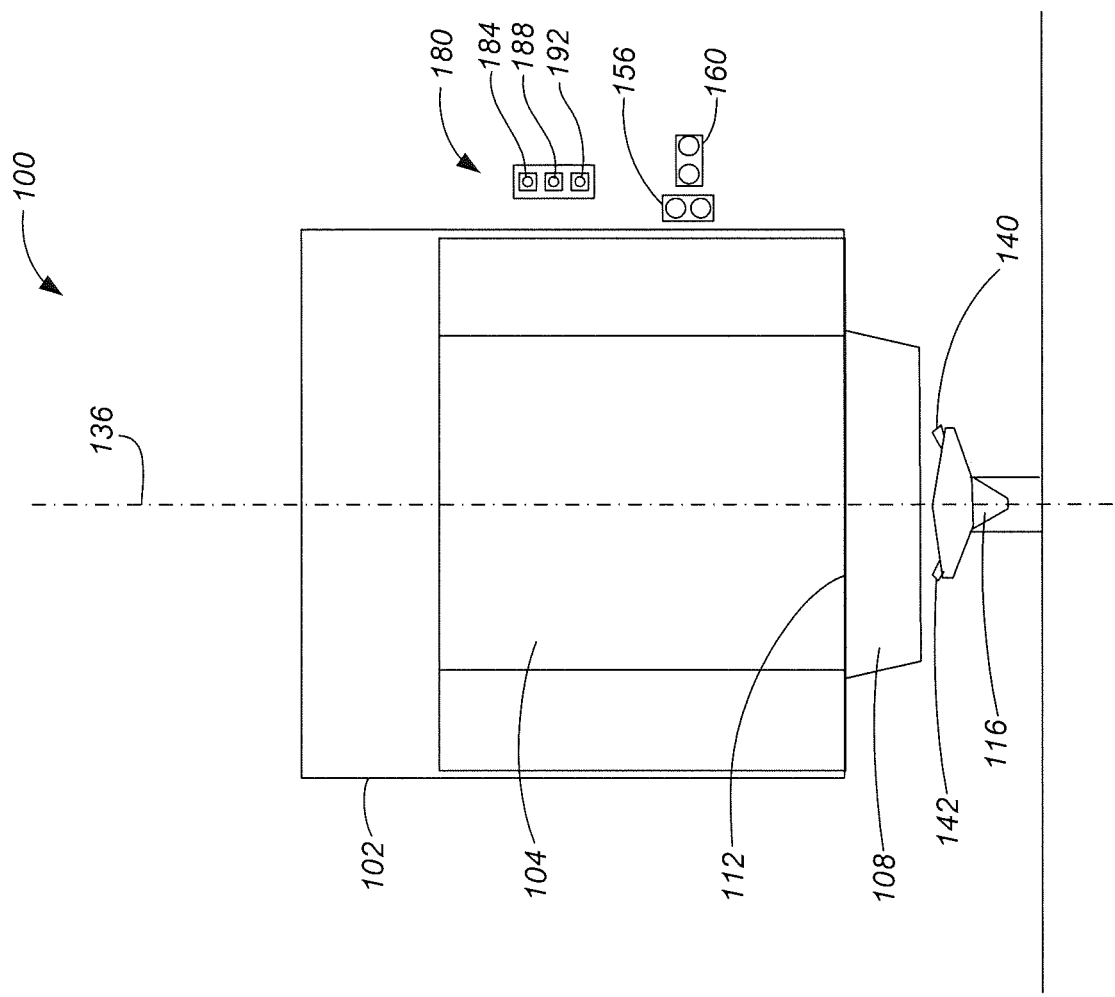

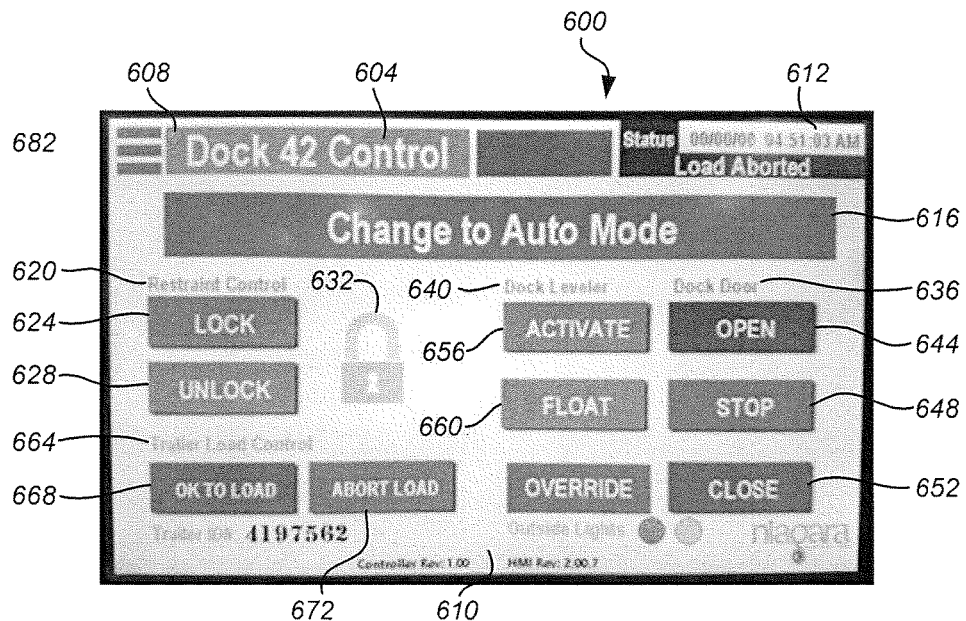
FIG. 6
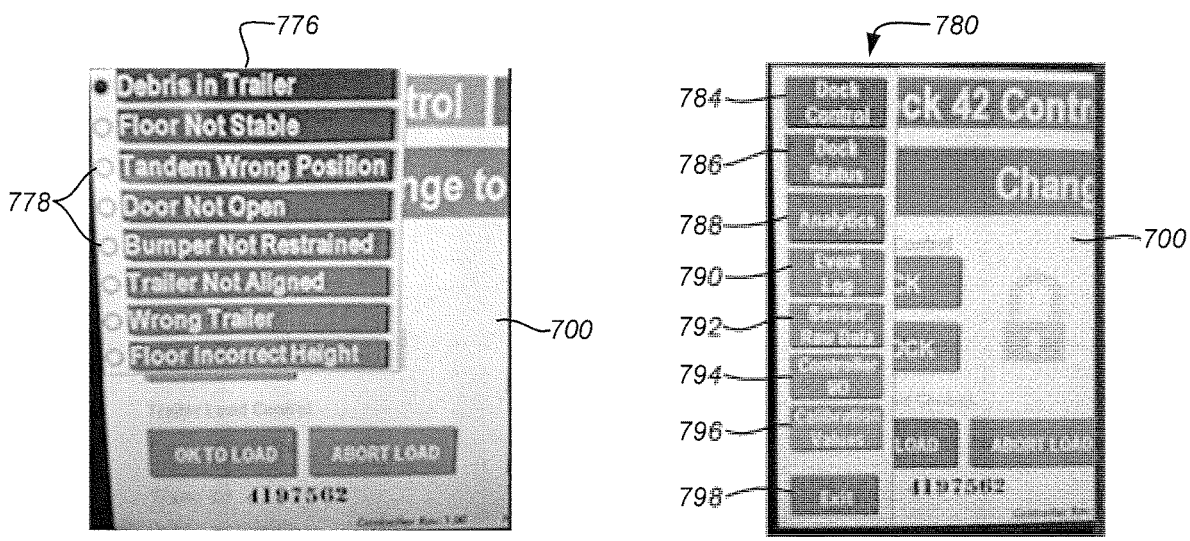
FIG. 7A
FIG. 7B

DOCK DOOR AUTOMATION SYSTEMS AND METHODS

PRIORITY

This application claims the benefit of and priority to U.S. Provisional Application No. 62/747,063 filed Oct. 17, 2018 and U.S. Provisional Application No. 62/782,243 filed on Dec. 19, 2018, entitled "Dock Door Automation System and Method."

FIELD

The field of the present disclosure generally relates to docking truck trailers. More particularly, the field of the present disclosure relates to a system and a method for automated engaging and disengaging of a truck trailer at a loading dock.

BACKGROUND

A loading dock or loading bay is an area of a building where products and goods are loaded and unloaded. Loading docks suitable for truck trailers are commonly found on commercial buildings, industrial buildings, and warehouses for delivery and shipping of equipment, products, and goods. Shipping plants and distribution centers typically have a multiplicity of loading docks, and service a continual stream of incoming and outgoing trucks. A conventional shipping process utilized by many shipping plants and distribution centers requires a dock coordinator or a forklift operator to manually open each dock door for an incoming trailer and then use a dock door control panel control system to engage a vehicle restraint and dock leveler.

SUMMARY

A system and a method are provided for servicing a truck trailer at a docking bay. The system comprises a programmable logic controller (PLC) system configured to operate the docking bay to accept, secure, and release the truck trailer. A first sensor and a second sensor are configured to detect an angle between a centerline of the docking bay and the truck trailer during backing into the docking bay. At least a third and fourth sensors are configured to detect a distance between a wall of the docking bay and the truck trailer. An outside lighting system is in communication with the PLC system and configured to provide feedback to a truck driver during backing of the truck trailer into the docking bay. The outside lighting system is configured to operate in response to signals passed from the sensors to the PLC system. A vehicle restraint system is in communication with the PLC system and configured to engage the truck trailer. An overhead door is configured to be opened by the PLC system once the trailer is engaged by the vehicle restraint system. A dock leveler is configured to be deployed by the PLC system after the overhead door is open. An inside dock light in communication with the PLC system is configured to indicate a status of the truck trailer to dock personnel.

In an exemplary embodiment, a system for servicing a truck trailer at a docking bay comprises a programmable logic controller (PLC) system configured to operate the docking bay to accept, secure, and release the truck trailer; at least a first sensor and a second sensor to detect an angle between a centerline of the docking bay and the truck trailer during backing into the docking bay; at least a third and fourth sensors to detect a distance between a wall of the docking bay and a rearmost portion of the truck trailer; an outside lighting system in communication with the PLC system and configured to provide feedback to a truck driver during backing the truck trailer into the docking bay, the lighting system configured to operate in response to signals from the first, second, third, and fourth sensors; a vehicle restraint system in communication with the PLC system and configured to fixate the truck trailer within the docking bay; an overhead door in communication with the PLC system and configured to open once the trailer is fixated by the vehicle restraint system; a dock leveler in communication with the PLC system and configured to deploy after the overhead door opens; and an inside dock light in communication with the PLC system and configured to indicate a status of the truck trailer to dock personnel.

In another exemplary embodiment, the first sensor and the second sensor are positioned with a substantially equivalent distance from a dock centerline and a substantially equal height above the top of a dock shelter. In another exemplary embodiment, each of the first sensor and the second sensor comprises two sensors positioned adjacent to one another, such that the sensors have a substantially equal height above the top of the shelter, the two sensors being oriented vertically so as to detect the angle of the truck trailer. In another exemplary embodiment, the two sensors are laser distance sensors (LDS) sensors.

In another exemplary embodiment, the third and fourth sensors further comprise a first sensor and a second sensor located below the floor of the docking bay. In another exemplary embodiment, the first and second sensors are LDS sensors. In another exemplary embodiment, the vehicle restraint system engages the truck trailer following a time delay after the truck trailer is sufficiently positioned within the docking bay. In another exemplary embodiment, once the vehicle restraint system engages the truck trailer, the overhead door is opened and the dock leveler is deployed. In another exemplary embodiment, the PLC system is configured to switch to an Alarm Mode and flash the outside signal lights and the inside dock light red and green simultaneously to indicate a fault when the vehicle restraint system fails to properly engage the truck trailer.

In another exemplary embodiment, the outside lighting system comprises outside signal lights configured to indicate to the driver when to move the truck trailer during backing into and exiting the docking bay. In another exemplary embodiment, the outside signal lights flash green to indicate to the truck driver that the docking bay is ready to receive the truck trailer, and wherein the inside dock light flashes red to indicate to dock personnel that the trailer is not yet ready for servicing. In another exemplary embodiment, the outside signal lights switch from green to red to indicate to the truck driver to stop backing the trailer into the docking bay once the truck trailer is sufficiently aligned and centered within the docking bay.

In another exemplary embodiment, the outside lighting system comprises directional arrow lights configured to help the driver to properly orient the truck trailer with respect to the centerline of the docking bay, and wherein a passenger side and a driver side of the directional arrow lights communicate to the driver directions to steer the trailer. In another exemplary embodiment, the directional arrow lights remain off while the truck trailer is properly aligned with the centerline. In another exemplary embodiment, either the passenger side or the driver side of the directional arrow lights illuminate with a steady yellow color when the trailer is not properly aligned with the centerline. In another exemplary embodiment, either the passenger side or driver side of the directional arrow lights flash yellow when the trailer has an improper offset angle relative to the centerline of the docking bay.

In an exemplary embodiment, a method for providing an automated docking bay comprises positioning one or more sensors to detect an orientation of a truck trailer and the docking bay; coupling a programmable logic controller (PLC) system with the one or more sensors; configuring the PLC system to signal a truck driver in response to orientation data received from the one or more sensors; placing the PLC system in communication with a vehicle restraint system, such that the PLC system causes the vehicle restraint system to engage and fixate the truck trailer in response to the orientation data; configuring the PLC system to raise an overhead door and deploy a dock leveler once the vehicle restraint system fixates the truck trailer; and configuring the PLC system to indicate a status of the truck trailer to dock personnel.

In another exemplary embodiment, positioning one or more sensors comprises deploying at least a first sensor and a second sensor so as to detect at least one angle of an alignment of the truck trailer relative to a centerline of the docking bay, and deploying at least one sensor to detect a distance between a wall of the docking bay and a rearmost portion of the truck trailer. In another exemplary embodiment, configuring the PLC system to signal the truck driver comprises implementing outside signal lights whereby the PLC system may direct the driver during backing into and exiting the docking bay. In another exemplary embodiment, configuring the PLC system to deploy the dock leveler comprises receiving signals from at least one of the one or more sensors so as to determine that the dock leveler is clear of obstruction before deployment thereof.

In an exemplary embodiment, an automated docking bay for servicing a truck trailer comprises: a programmable logic controller system configured to operate the docking bay; a plurality of sensors configured to detect an orientation of the truck trailer with respect to the docking bay; an outside lighting system configured to provide feedback to a truck driver during backing the truck trailer into the docking bay; a vehicle restraint system configured to fixate the truck trailer within the docking bay; an overhead door configured to open once the truck trailer is fixated by the vehicle restraint system; a dock leveler configured to deploy after the overhead door opens; and a human machine interface system in communication with the programmable logic controller system and the plurality of sensors.

In another exemplary embodiment, the plurality of sensors comprises: a first sensor and a second sensor to detect an angle and an offset of the truck trailer within the docking bay; a third sensor to detect a position of a tandem of the truck trailer; a fourth sensor to detect a distance between a wall of the docking bay and a rearmost portion of the truck trailer; and a fifth sensor to observe the status of an interior of the docking bay.

In another exemplary embodiment, the first sensor and the second sensor are laser distance sensors mounted to a side of the docking bay by way of a bracket. In another exemplary embodiment, the third sensor is a laser distance sensor mounted to the docking bay by way of the bracket. In another exemplary embodiment, the fourth sensor is an ultrasonic sensor that is recessed behind the vehicle restraint system. In another exemplary embodiment, the vehicle restraint system engages the truck trailer after the truck trailer is properly positioned within the docking bay. In another exemplary embodiment, the overhead door is opened and the dock leveler is deployed after the vehicle restraint system successfully engages the truck trailer.

In another exemplary embodiment, the fifth sensor is a vision sensor configured for recognition and assessment of objects in the interior of the docking bay. In another exemplary embodiment, the fifth sensor is configured to detect obstructions located near or on the dock leveler during lifting and lowering of the overhead door. In another exemplary embodiment, the fifth sensor is configured to determine whether the height of the truck trailer is proper based on communications with the programmable logic controller system. In another exemplary embodiment, the fifth sensor is configured to detect the presence of improperly opened truck trailer doors. In another exemplary embodiment, the dock leveler is deployed after the overhead door is opened and the truck trailer doors are detected to be properly opened.

In another exemplary embodiment, the human machine interface is configured to enable an authorized user to operate the docking bay based on information flow to and from the plurality of sensors. In another exemplary embodiment, the human machine interface includes a touch screen configured to visually represent docking bay functions. In another exemplary embodiment, the touch screen is configured to display docking bay status information based on data provided by the plurality of sensors. In another exemplary embodiment, the human machine interface is configured to enable the authorized user to operate the docking bay by way of the touch screen according to the docking bay status information. In another exemplary embodiment, the human machine interface is configured to enable the authorized user to switch the operation of the docking bay between an automation mode and a manual mode. In another exemplary embodiment, the human machine interface is configured to provide an interface whereby calibration and testing tasks may be performed. In another exemplary embodiment, the human machine interface is configured to display sensor raw data whereby calibration and testing tasks may be performed.

BRIEF DESCRIPTION OF THE DRAWINGS

The drawings refer to embodiments of the present disclosure in which:

FIG. 1A is a plan view of an exemplary embodiment of a truck trailer docking bay according to the present disclosure;

FIG. 1B is a plan view of an exemplary embodiment of a truck trailer docking bay with laser distance sensors in accordance with an embodiment of the present disclosure;

FIG. 5 illustrates a close-up view of sensors incorporated into the exemplary embodiment of the truck trailer docking bay illustrated in FIG. 1, according to the present disclosure;

FIG. 6 illustrates an exemplary embodiment of a main screen that may be displayed to an authorized user that has successfully logged into the Human Machine Interface system;

FIG. 7A illustrates an exemplary embodiment of a message list that may be displayed on the main screen of FIG. 7 when an Abort Load button is pressed;

FIG. 7B illustrates an exemplary embodiment of a tribar menu that may be displayed when an operator presses on a tribar menu button displayed on the main screen of FIG. 7;

Figure 2:
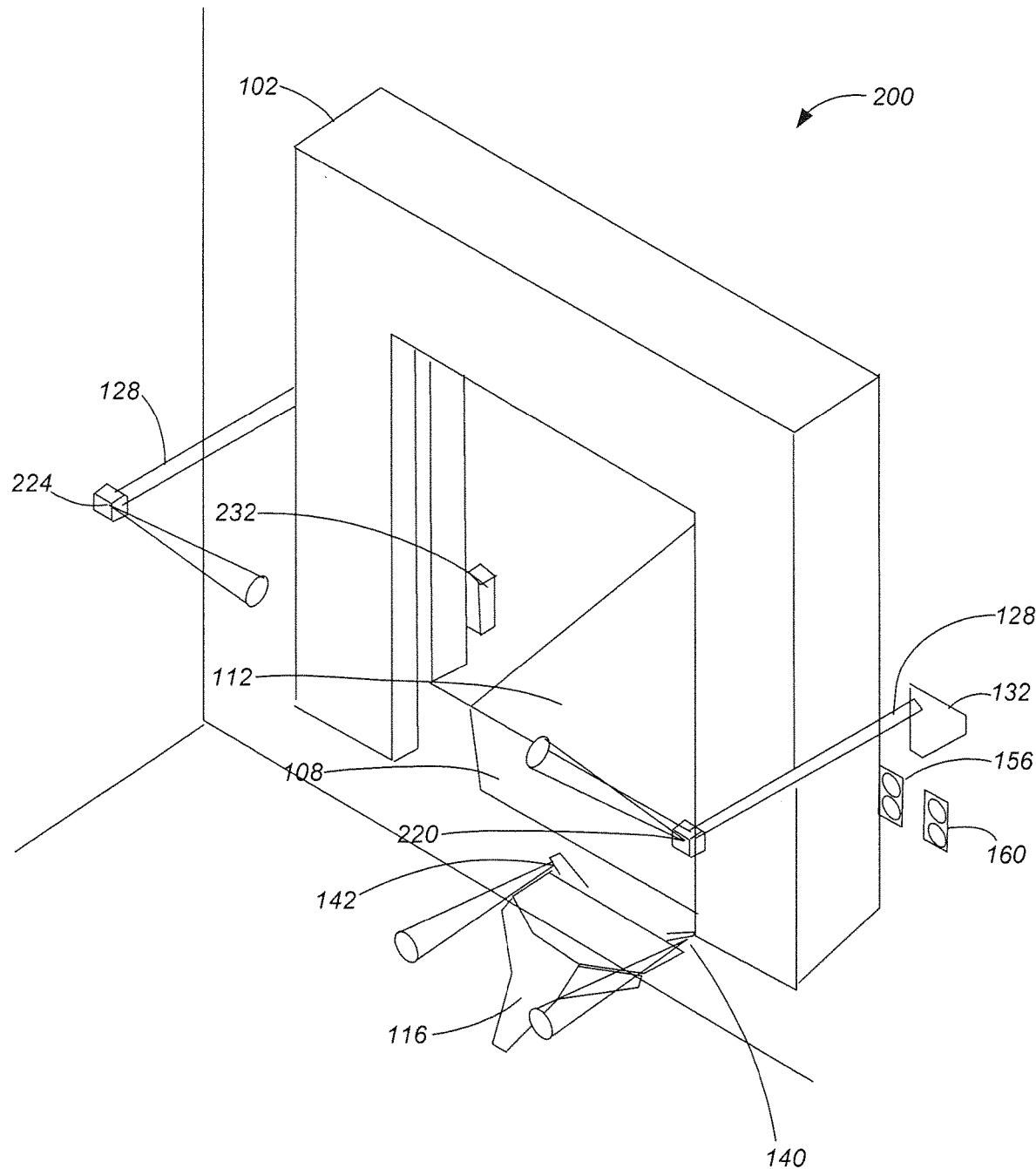
FIG. 2 is an isometric view of an exemplary embodiment of a truck trailer docking bay in accordance with the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In response to the problems described above, what is needed is a system and method whereby the engagement/disengagement process of a whole set of dock equipment is automated, including at least the dock door, the vehicle restraint, the dock leveler, and trailer positioning and alignment. It is envisioned that a shipping clerk, stationed at a front gate or security post, would be able to engage dock positions remotely while assigning dock doors to incoming trucks. Preferably, the dock door would open automatically once a trailer is properly aligned at the dock, and then the vehicle restraint and dock leveler would engage automatically once the dock door opens fully. It is further envisioned that forklift operators could disengage the dock equipment and release each trailer by simply pushing a Programmable Logic Controller (PLC). Once the trailer is disengaged, the dock position would then appear available to the shipping clerk.

In the description herein, numerous specific details are set forth in order to provide a thorough understanding of the present invention. It will be apparent, however, to one of ordinary skill in the art that the present invention may be practiced without these specific details. In other instances, well known components or methods have not been described in detail but rather in a block diagram, or a schematic, in order to avoid unnecessarily obscuring the present invention. Further specific numeric references such as "first dock," may be made. However, the specific numeric reference should not be interpreted as a literal sequential order but rather interpreted that the "first dock" is different than a "second dock." Thus, the specific details set forth are merely exemplary. The specific details may be varied from and still be contemplated to be within the spirit and scope of the present invention. The term "coupled" is defined as meaning connected either directly to the component or indirectly to the component through another component.

In general, the present disclosure describes a system and method for automatically engaging a truck trailer at a loading dock. The system comprises a signal system, such as a programmable logic controller (PLC) system, configured to switch the loading dock to a ready-to-engage mode whereby the loading dock is ready to accept an incoming truck trailer. In some embodiments, the system engages automatically when a trailer is properly parked at the loading dock. One or more sensors can be configured to measure an alignment of a trailer relative to a centerline of the loading dock. Further, one or more sensors can be configured to measure a distance between the wall of the loading dock and a rearmost portion of the incoming trailer and the angle of such. Outside signal lights operating in response to signals from the sensors to provide feedback to a truck driver backing the incoming trailer toward the dock door. A vehicle restraint system engages the trailer in response to signals passed to the PLC system from the sensors. A dock door opens once the trailer is engaged with the vehicle restraint system. A dock leveler deploys after the dock door opens. The dock leveler provides a smooth transition between the trailer and a floor of the loading dock. An inside dock light indicates to dock personnel, such as a forklift operator, that the truck is ready to be serviced after the dock leveler deploys. Once servicing of the trailer is finished, the forklift operator may initiate releasing the trailer from the loading dock by way of PLC communication.

FIG. 1A illustrates an exemplary embodiment of a docking bay 100 according to the present disclosure. The docking bay 100 is configured to receive a truck trailer with the trailer doors opened so as to facilitate unloading and loading items that are shipped within the trailer. The docking bay 100 comprises a shelter 102 surrounding an overhead door 104 which is configured to be rolled upwards and allow entry into the interior of the truck trailer. A dock leveler 108 is configured to provide a smooth transition between the trailer and a floor 112 of the loading dock. The docking bay 100 further comprises a vehicle restraint system 116 configured to engage the trailer. As described below, the vehicle restraint system 116 typically is a hydraulic restraining device used to fixate trucks and semi-trailers to the face of the loading dock.

In many embodiments, above the overhead door 104 can be a first sensor pair 120 and a second sensor pair 124. Supporting each of the first and second sensor pairs 120, 124 is a beam 128 fastened above the docking bay 100 by way of a mount 132. As best shown in FIG. 2, the beams 128 generally are elongate members configured to support the sensors 120, 124 in an extended position suitable for detecting an alignment of an approaching truck trailer, as described herein. As shown in FIG. 1A, the first and second sensor pairs 120, 124 preferably are positioned with a substantially equivalent distance from a dock centerline 136 and a substantially equal height above a top of the shelter 102.

FIG. 5 illustrates a close-up view of the sensor pair 124 with the beam 128 removed for the sake of clarity. As with the sensor pair 120, the sensor pair 124 comprises a first sensor 144 and a second sensor 148 positioned adjacent to one another such that the sensors 144, 148 have a substantially equal height above the top of the shelter 102. Preferably, the sensors 144, 148 are oriented vertically so as to detect the presence of a top of the truck trailer. The sensors 144, 148 may each be adjusted within an angle 152 relative to true vertical so as to account for slight variations in alignment that may exist within the beam 128 and the mount 132. In the illustrated embodiment, the sensors 144, 148 are of the laser guided vehicle (LGV) variety. It is contemplated, however, that various other suitable types of sensor may be utilized for the sensors 144, 148, such as, by way of example, Laser Distance Sensors (LDS), or ultrasonic sensors.

In addition to the first and second sensor pairs 120, 124, a sensor 140 and a sensor 142 are located below the floor 112 of the loading dock behind the vehicle restraint system 116. Although each of the sensors 140, 142 comprises one sensor, it is contemplated that in some embodiments the sensors 140, 142 may each comprise more than one sensor, such as, for example, two adjacently disposed sensors. Further, as stated above with respect to the sensors 144, 148, the sensors 140, 142 preferably are LDS sensors, although other types of suitable sensors are contemplated.

On a driver side location of the docking bay 100 is system of indicator lights configured to assist the truck driver with backing the trailer 312 into the docking bay 100. As described in detail below, outside signal lights 156 generally are configured to indicate to the driver when to proceed with backing the trailer 312 into the docking bay 100 and when to stop. Directional arrow lights 160 are configured to help the driver to properly orient the trailer 312 with respect to the docking bay 100. The outside signal lights 156 and the directional arrow lights 160 operate in response to signals from the PLC system based on orientation data obtained by way of the sensors 120, 124, 140, 142 to ensure that the trailer 312 is properly centered and aligned in the docking bay 100 in accordance with at least one of the certain parameters illustrated in FIG. 5, including, but not necessarily limited to an angle between the dock and the trailer 312, an offset between the centerline 136 and the centerline of the trailer 312, and a distance between dock wall and the rearmost portion of the trailer 312. Further, as best shown in FIG. 2, an inside signal light 232 indicates the status of the trailer to dock personnel and is particularly useful during times when the overhead door 104 is closed. In some embodiments, the signal light may be positioned on a control panel inside the docking bay 100, without limitation.

Further, in some embodiments, either of sensors 140, 142 may comprise a single ultrasonic sensor, such as sensor 1916 (see FIG. 19), that is recessed behind the vehicle restraint system 116 and configured to measure the distance between dock door and the rearmost portion of trailer 312, as well as determining whether the trailer 312 is present at the docking bay 100. In some embodiments, the single ultrasonic sensor 1916 measures if a trailer impact guard is in a correct position. As such, the single ultrasonic sensor 1916 ensures that the trailer 312 is parked at a proper distance from the wall of the docking bay 100.

Moreover, it is contemplated that one or more sensors may be disposed in various interior locations within the docking bay 100 and configured to detect and/or identify the status of the docking bay and the trailer 312. In some embodiments, the one or more sensors include a single LDS sensor and a Vision Sensor (VS), such as sensor 1920 (see FIG. 19), that are mounted at one side of the overhead door 104 by way of a suitable mounting bracket. It is contemplated that either of the single LDS sensor or the VS sensor 1920 may be configured to detect the presence of a swinging door or a roll-up door of the trailer 312 that is fully open or closed. The VS sensor 1920 preferably is configured for recognition and assessment of nearby objects and scenes. For example, the VS sensor 1920 may be configured to detect lifting and lowering of the overhead door 104 as well as check for obstructions located near or on the dock leveler 108. Further, the VS sensor 1920 may be configured to determine whether the height of the trailer 312 is proper, based on internal calculations stemming from data received by the VS sensor 1920.

It should be understood that the above-described sensors, such as the LDS sensors 124, 128, 132, the ultrasonic sensor 1916, and the VS sensor 1920, generally are an I/O variety of sensor that facilitates a bi-directional flow of information to and from each sensor. As will be appreciated, I/O sensors advantageously enable troubleshooting of problem areas, while allowing for easy configuration of the sensors without requiring physical changes based on estimation. As such, the I/O sensors enable an authorized user to control and calibrate sensor values without having to physically calibrate the sensors during maintenance or optimization. All calibrations can be done either in person or remotely, thereby giving other authorized users multiple ways to address any issues.

FIG. 1B illustrates a plan view of an exemplary embodiment of a truck trailer docking bay with laser distance sensors. In many embodiments, the docking bay 100 can include a group of Laser Distance Sensors (LDS) sensors 180 mounted adjacent to the overhead door 104. In the illustrated embodiment of FIG. 1B, the sensors 180 comprise three LDS sensors 184, 188, 192 that are mounted to a single bracket. In further embodiments, the three LDS sensors 184, 188, 192 may be mounted to a wall 316 of the docking bay by way of the single bracket or may be mounted to a side of a trailer 312 (see FIG. 3), such as the driver-side, for use during backing the trailer 312 into the docking bay. Two of the LDS sensors, 184 and 188, are configured to determine the alignment of the trailer 312 with respect to a dock centerline 136. The two LDS sensors 184, 188 may preferably be configured to dynamically measure distances and angles so as to reduce the potential for false negatives, such as identifying an aligned trailer 312 as being misaligned at the docking bay. In certain embodiments, the third LDS sensor 192 can be configured to detect object distances and is mounted so as to determine if the tandems of the trailer 312 are in a correct position with respect to the docking bay 100.

Figure 3:
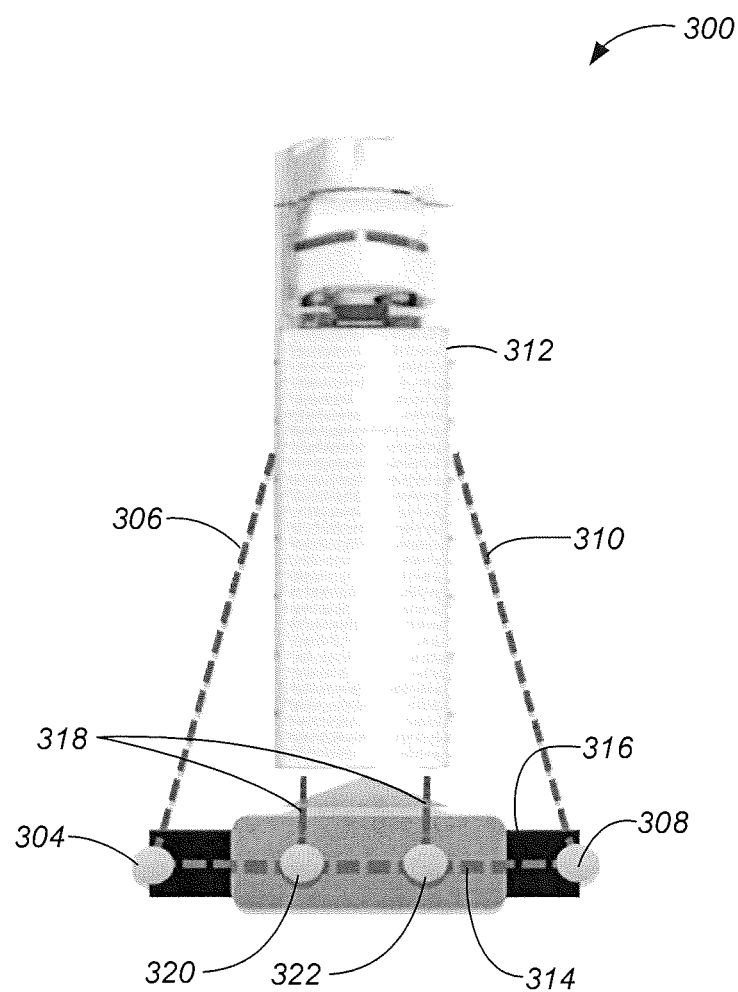
FIG. 3 illustrates a top view of an exemplary embodiment of multiple sensors being used to align a truck trailer and trigger an engagement of dock equipment, according to the present invention.

FIG. 3 illustrates a top view of an exemplary embodiment 300 of sensors being used to align a trailer and trigger an engagement of dock equipment. In the embodiment illustrated in FIG. 3. a first sensor 304 and a second sensor 308 are used to measure respective distances 306 and 310 the distance between a trailer 312 and a wall 316 of the dock. As will be appreciated, knowledge of distances 306, 310, as well as a distance 314 between the sensors 304, 308 facilitates determining whether the trailer 312 is aligned with the dock door. A third sensor 320 and a fourth sensor 322 measure a distance 318 between dock door and the rearmost portion of trailer 312, as well as determining whether or not the trailer doors are open. As will be appreciated, in the embodiment illustrated in FIG. 1A, the sensor pairs 120, 124 perform the operation of the first and second sensors 304, 308, respectively, and thus the sensor pairs 120, 124 ensure that the trailer is properly aligned at the docking bay 100. In other embodiments, the sensors may be LDS sensors as described in FIG. 1B. Similarly, the sensors 140, 142 can perform the operation of the third and fourth sensors 320, 322, illustrated in FIG. 3, ensuring that the trailer is parked with a proper distance from the wall 316 of the docking bay. In some embodiments, one or both of the sensors 140, 142 are used to determine whether or not the trailer doors are open, as well as providing a further determination of the alignment of the trailer 312.

Preferably, an angle between the truck trailer and the docking bay 100 is to be not greater than substantially 1 degree. Further, an offset between the centerline 136 and the centerline of the truck trailer 312 preferably is to be not greater than substantially 6 inches. FIGS. 5-6 respectively illustrate a multiplicity of certain parameters and dimensions that may be used in the course of operating the docking bay 100 in accordance with the present disclosure. As will be appreciated, in other embodiments than illustrated herein, other parameters and dimensions may be utilized to advantageously receive truck trailers into the docking bays. As such, it should be understood that the docking bay 100 of the present disclosure is not to be limited to the certain parameters and dimensions disclosed in FIGS. 5-6, but rather a wide variation of the parameters and dimensions disclosed in FIG. 5-6 may be used in conjunction with the docking bay without deviating beyond the spirit and scope of the present disclosure.

FIG. 2 is an isometric view of an exemplary embodiment of a docking bay 200 in accordance with the present disclosure. The docking bay 200 is substantially similar to the docking bay 100, as well as the operation thereof, with the exception that the docking bay 200 comprises a first sensor 220 and a second sensor 224 that are positioned on opposite sides of the shelter 102. As shown in FIG. 2, the sensors 220, 224 are oriented in a horizontal configuration and directed toward one another so as to detect the presence of the sides of a truck trailer, such as the trailer 312. In the embodiment illustrated in FIG. 2, each of the sensors 220, 224 may comprise an individual ultrasonic sensor suitable for detecting the trailer 312. In other embodiments, however, the sensors 220, 224 may be comprised of more than one sensor, such as, by way of example, two horizontally disposed sensors. Further, it is contemplated that the sensors 220, 224 need not be limited to ultrasonic sensors, but rather the sensors 220, 224 may be comprised of any type of sensor suitable for detecting the presence of the trailer 312, such as LDS sensors, as described in connection with FIG. 1B.

As stated above, the docking bays 100, 200 generally comprise a programmable logic controller (PLC), or an automated PLC system, which is configured to process stored instructions. As such, it should be understood that the PLC incorporated into each of the docking bays 100, 200 processes the stored instructions which causes the docking bays 100, 200 to perform operations, discussed herein, so as to guide the truck trailer 312 into and out of the docking bays. It should be further understood that the PLC incorporated into each of the docking bays 100, 200 is configured to allow for human interaction, such that the docking bays 100, 200 may be switched into a manual operational mode.

Figure 4:
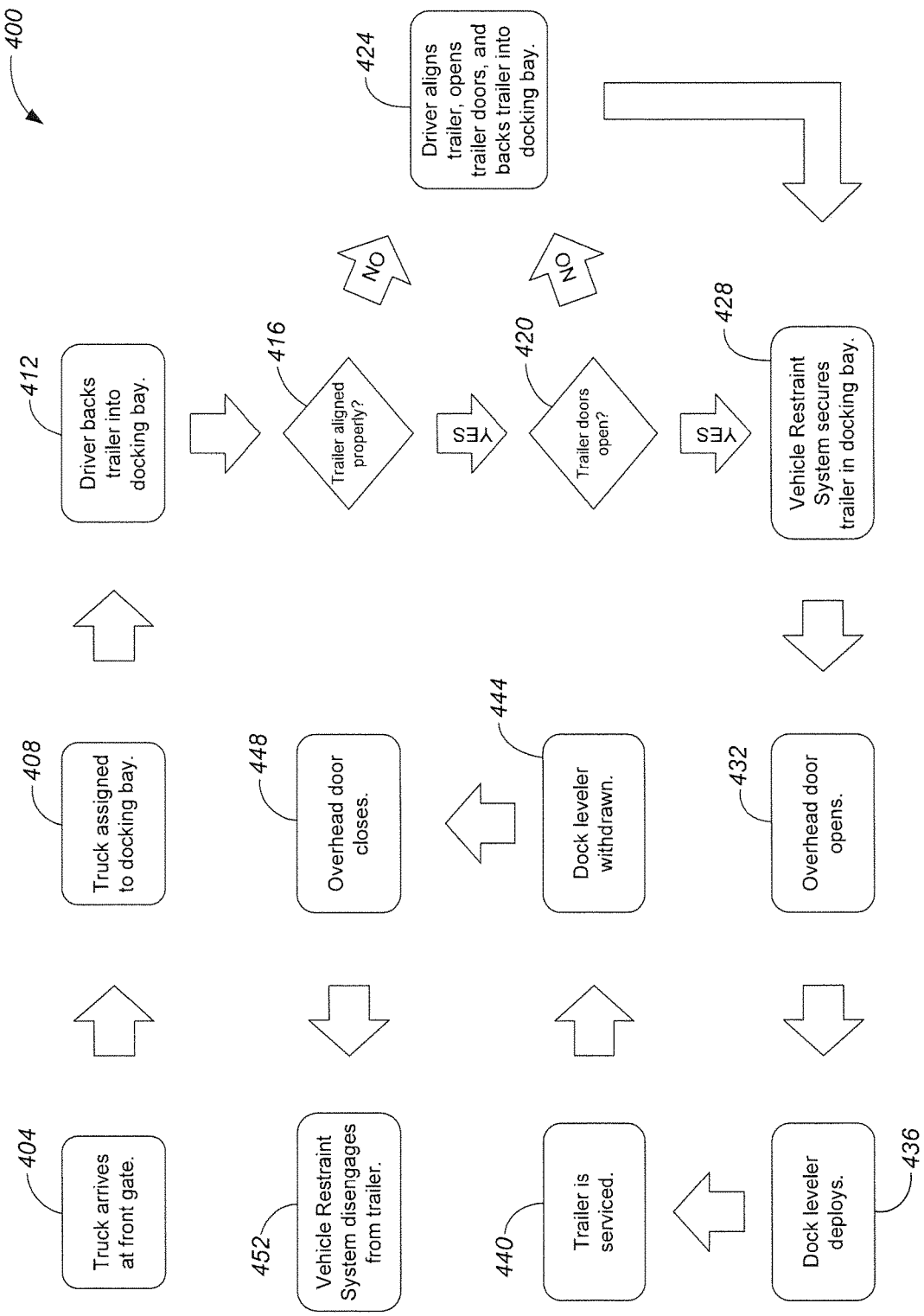
FIG. 4 is a schematic illustrating an exemplary embodiment of a workflow method utilizing fully automated dock equipment incorporated into a truck trailer docking bay in accordance with the present invention.

FIG. 4 is a schematic illustrating an exemplary embodiment of a workflow method 400 utilizing an automated PLC system coupled with dock equipment to provide a fully automated docking bay, such as the docking bays 100, 200. In the following paragraphs, the workflow method 400 is described in connection with the docking bay 100 for the sake of brevity. It should be understood, however, that the workflow method 400 may be performed with the docking bay 200, as well as various other embodiments of automated docking bays including docking bay systems with LDS sensors, without limitation.

The workflow method 400 can begin at a step 404 when a trailer truck, such as the trailer 312, arrives at a front gate or security post at a distribution center or shipping plant. A driver of the truck preferably provides a purchase order number or trip number to a shipping clerk at the gate. At step 408, the shipping clerk assigns the truck to a dock door, such as the docking bay 100. In some embodiments, the shipping clerk may use a signal system to switch the assigned docking bay into a ready-to-engage mode. The ready-to-engage mode typically prepares dock equipment at the docking bay to receive the incoming truck. It is envisioned that the shipping clerk readies the dock equipment by way of a digital signal initiated at the front gate by way of a button, switch, touch screen, or any other suitable interface. In some embodiments, the shipping clerk may switch a System Key to an Automatic Mode position, and an Automatic Mode pilot light may switch on to indicate that the system is ready for automation. In other embodiments, the system can engage automatically when the trailer 312 is properly parked at the docking bay.

Once the docking bay 100 is ready to accept the incoming truck, the overhead door 104 is maintained in a closed position, the dock leveler 108 is stored and disabled, and the vehicle restraint system 116 is disengaged and disabled. The outside signal lights 156 flash green to indicate to the truck driver that the docking bay is ready to receive the trailer 312, while the directional arrow lights 160 remain off. The inside dock light 232 flashes red to indicate to workers within the warehouse, such as dock personnel, that the trailer 312 is not yet ready to be serviced.

At a step 412, the sensors 120, 124, 140, 142, 1916 monitor the trailer 312 as the driver backs the trailer toward the assigned docking bay 100. It will be appreciated that the driver opens the trailer doors before backing the trailer toward the dock door. At a step 416, the sensors can determine whether or not the trailer 312 is properly aligned with the dock door. In some embodiments, a step 420 may include at least one sensor determining whether or not the trailer doors are open. In other embodiments, the step 420 may be omitted, without limitation. If a misalignment of the trailer is detected in step 416, or closed trailer doors are detected at step 420, the driver is alerted at a step 424.

During backing of the trailer 312 into the docking bay 100, as the trailer 312 enters a detection zone of the sensor pairs 120, 124, (or LDS sensors), the directional arrow lights 160 may remain off while the trailer is properly centered relative to the dock centerline 136. If the trailer is not properly centered, however, either a passenger side or a driver side of the directional arrow lights 160 can illuminate with a steady yellow color. If the trailer has an improper offset angle relative to the dock centerline 136, either the passenger side or the driver side of the directional arrow lights 160 may flash yellow. It should be understood that when an individual directional arrow light illuminates or flashes, it is communicating to the driver to move the trailer in the direction of the individual directional arrow light.

When the trailer 312 is properly oriented during backing into the docking bay 100, the directional arrow lights 160 can both illuminate with the steady yellow color. In other embodiments, the driver may be alerted by way of various other signals, such as different colors, flashing lights, audible sounds, horns, beeps, and the like. In another embodiment, a first light having one color may be used to indicate a misalignment of the truck, and a second light having a second color may be used to indicate closed trailer doors. Once alerted at step 424, the driver generally can attempt to realign the trailer 312 with the docking bay 100 and ensure that the trailer doors are open.

Once the trailer 312 is correctly aligned and centered within the docking bay 100, and that the trailer doors are open, at a step 428 the outside signal lights 156 switch from green to red to indicate to the driver to stop backing the trailer 312 into the docking bay. During step 428, the directional arrow lights 160 turn off. The inside dock light 232 switches from red to a flashing green color to indicate to dock personnel that the truck has been signaled to stop backing into the docking bay 100. In some embodiments, an additional interior beacon may be configured to flash so as to gain the attention of dock personnel. In other embodiments, however, the driver and dock personnel may be alerted by way of a variety of other types of signals, such as different colors, flashing lights, audible horns, sounds, beeps, as mentioned above.

Once the outside signal lights 156 switch to red, at step 428, a timed delay commences, such as a 10-second delay, after which the vehicle restraint system 116 attempts to engage the trailer 312. The vehicle restraint system 116 typically is a hydraulic, self-aligning restraining device used to secure trucks and semi-trailers having an intact Rear Impact Guard (RIG) to the face of the docking bay 100. It will be recognized by those skilled in the art that the vehicle restraint system 116, when engaged, limits vertical motion of the trailer 312 during loading and/or unloading by securing the RIG by way of a hydraulically positioned steel hook, while support cylinders extend under the trailer 312 to the limit vertical motion. Further, engaging the trailer 312 with the vehicle restraint system 116 prevents forward movement of the trailer and truck which would otherwise create a dangerous gap between the face of the docking bay and the rear of the trailer. In some embodiments, the vehicle restraint system 116 may further operate as an obstruction noticeable to the driver, in the event the driver mistakenly attempts to pull the truck away from the dock while the trailer 312 is being loaded and/or unloaded.

In an event that the vehicle restraint system 116 fails to properly engage the trailer 312, the automated PLC system can switch to an Alarm Mode, at which point the outside signal lights 156 and the inside dock light 232 switch to simultaneously flashing red and green to indicate that a fault has occurred. In some embodiments, an audible alarm may sound inside and outside of the docking bay 100 to bring attention to the fault. It is contemplated that a supervisor must enter a Horn Override code to silence the audible alarm. Once the Alarm Mode is initiated, human intervention is may be required to verify that the trailer 312 is suitably secured and determine the cause of the fault. In some embodiments, dispatch office personnel may decide whether to turn away the trailer 312 from the docking bay 100 or switch the docking bay to a Manual Mode of operation.

Once the vehicle restraint system 116 successfully engages the trailer 312, the workflow method 400 advances to a step 432 wherein the overhead door 104 can automatically open. In one embodiment, one or more of the sensors 140, 142 are used to verify that the trailer doors are open, and that the dock leveler 108 is clear of obstruction. When the dock leveler is not clear, the automated PLC system waits until the obstruction is removed from the dock leveler 108 before proceeding, following a timed delay, such as a 2-second delay. Once the automated PLC system verifies that the overhead door 104 is open, the trailer doors are open, and the dock leveler 108 is clear, the workflow method 400 can advance to a step 436 wherein the dock leveler 108 may automatically raise, extending toward the rear of the trailer 312, and lowering onto a bed of the trailer 312. It will be recognized that dock levelers generally provide a smooth transition between the trailer 312 and the floor 112 of the loading dock, thereby minimizing jolts and jarring to forklift operators and damage to products and equipment due to "dock shock."

With the dock leveler 108 deployed in a suitable position, the automated PLC system can return to a "Dock Ready" signal to the dispatch office and the inside dock light 232 may be turned off so as to indicate to a forklift operator, or other personnel, that the trailer 312 is secured and ready to be serviced by loading and/or unloading. In some embodiments, the inside dock light 232 may be turned green so as to indicate that the trailer 312 is ready to be serviced. Further, in some embodiments an Automatic Mode pilot light may be illuminated so as to indicate to dispatch personnel that the trailer is being serviced. It should be understood, however, that any automation fault can halt the workflow method 400 and cause the Automatic Mode pilot light to be turned off, at which point human intervention may be required to determine the nature of the fault.

Once loading and/or unloading the trailer 312 is finished, at a step 440 the forklift operator typically indicates that the trailer 312 is ready to be released from the dock. In an embodiment, the forklift operator may indicate that the truck is ready to leave the docking bay simply by PLC communication. For example, the forklift operator may use a button or switch to initiate a "Remote Disengage Request" that is received by the automated PLC system or is sent to the dispatch office for acknowledgement. Once the "Remote Disengage Request" is accepted, the workflow method 400 can advance to a step 444. At the step 444, the inside dock light 232 begins flashing red while the automation PLC system verifies that the dock leveler 108 is clear of obstruction before returning the dock leveler to a folded position, illustrated in FIGS. 1A-2. In some embodiments, an interior beacon may flash red for 15 seconds to indicate to dock personnel that withdrawal of the dock leveler 108 has begun. After the lock leveler 108 successfully returns to the folded position, the overhead door 104 is closed at a step 448. At a step 452, the vehicle restraint system 116 disengages from the trailer 312 and then the outside signal lights 156 switch from red to green to indicate to the driver that the trailer 312 is finished being serviced. Simultaneously, the docking bay 100 shows as available to dispatch personnel, or to a shipping clerk at the front gate. The truck driver may pull the trailer 312 away from the docking bay 100, close the trailer doors, and then proceed to the front gate to check out with the shipping clerk.

It should be understood that in the event of a fault, the automated PLC system may be switched to a Manual Mode of operation, as mentioned above. In the Manual Mode, dock personnel may operate the equipment at the docking bay 100 by using various switches, keys, controls, or buttons. For example, once the trailer 312 is properly parked at the docking bay 100, a dock operator may press a Lock button to activate the vehicle restraint system 116 to secure the trailer. If the vehicle restraint system 116 fails to properly engage the trailer, the Alarm Mode can be initiated, as described above. Once the trailer is properly secured, the operator may press a Door Open button to raise the overhead door 104 and enable the dock leveler 108. After the operator verifies that the overhead door 104 is open, the trailer doors are open, and the dock leveler 108 is clear of obstruction, the operator may press a Leveler Raise button to extend the dock leveler 108 toward the rear of the trailer 312. After the dock leveler 108 lowers onto the bed of the trailer 312, a "Dock Ready" signal may be returned by the automated PLC system. The trailer 312 may then be serviced by loading and/or unloading contents therein.

Once the forklift operator indicates that the trailer 312 is ready to be released from the dock, the operator may again press the Leveler Raise button to raise and retract the dock leveler 108. Once the dock leveler 108 withdraws into the folded position, the operator may press a Door Close button to lower and close the overhead door 104. After the overhead door 104 closes, the operator may press an Unlock button to disengage the vehicle restraint system 116 from the trailer 312. In some embodiments, the inside dock light 232 may begin flashing red, and the outside signal lights 156 may switch to flashing green to indicate to the driver that the trailer 312 may depart from the docking bay 100.

As discussed above with reference to FIG. 1B, it is contemplated that the docking bays 100, 200 are not limited to the specific sensor pairs described hereinabove. For example, in some embodiments, the docking bay 200 can include a plurality of Laser Distance Sensors (LDS), such as sensors 1904, 1908, 1912 (see FIG. 19), mounted to a single bracket in lieu of the sensor pairs 220, 224 and the beams 128. The three LDS sensors 1904, 1908, 1912 may be mounted to the wall 316 of the docking bay by way of a single bracket or may be mounted to a side of the trailer 312, such as the driver-side, for use during backing the trailer 312 into the docking bay. Two of the LDS sensors, 1904 and 1908, are typically configured to determine the alignment of the trailer 312. The two LDS sensors 1904, 1908 preferably are configured to dynamically measure distances and angles so as to reduce the potential for false negatives, such as identifying an aligned trailer 312 as being misaligned at the docking bay. The third LDS sensor 1912 is often configured to detect object distances and is mounted so to as determine if the tandems of the trailer 312 are in a correct position with respect to the docking bay 200.

In some embodiments, a single ultrasonic sensor, such as sensor 1916 (see FIG. 19), may be recessed behind the vehicle restraint system 116 of the docking bay in lieu of the sensors 140, 142. The single ultrasonic sensor 1916 can measure the distance between dock door and the rearmost portion of trailer 312, as well as determining whether the trailer is present at the docking bay 200. In some embodiments, the single ultrasonic sensor 1916 may measure if a trailer impact guard is in a correct position. As such, the single ultrasonic sensor 1916 can ensure that the trailer 312 is parked at a proper distance from the wall of the docking bay 200.

Moreover, it is contemplated that one or more sensors may be disposed in various interior locations within the docking bays 100, 200 and configured to detect and/or identify the status of the docking bay and the trailer 312. In some embodiments, the one or more sensors may include a single LDS sensor and a Vision Sensor (VS), such as sensor 1920 (see FIG. 19), that are mounted at one side of the overhead door 104 by way of a suitable mounting bracket. It is contemplated that either of the single LDS sensor or the VS sensor 1920 may be configured to detect the presence of a swinging door or a roll-up door of the trailer 312 that is fully open or closed. The VS sensor 1920 preferably is configured for recognition and assessment of nearby objects and scenes. For example, the VS sensor 1920 may be configured to detect lifting and lowering of the overhead door 104 as well as check for obstructions located near or on the dock leveler 108. Further, the VS sensor 1920 may be configured to determine whether the height of the trailer 312 is proper, based on internal calculations stemming from data received by the VS sensor 1920.

It should be understood that the above-described sensors, such as the LIDS sensors 1904-1912, the ultrasonic sensor 1916, and the VS sensor 1920, generally are an I/O variety of sensor that facilitates a bi-directional flow of information to and from each sensor. As will be appreciated, I/O sensors advantageously enable troubleshooting of problem areas, while allowing for easy configuration of the sensors without requiring physical changes based on estimation. As such, the I/O sensors enable an authorized user to control and calibrate sensor values without having to physically calibrate the sensors during maintenance or optimization. All calibrations can be done either in person or remotely, thereby giving other authorized users multiple ways to address any issues.

It is contemplated that the docking bays 100, 200 may, in some embodiments, include a control panel, or a Human Machine Interface (HMI), that advantageously enables an authorized user to operate the docking bay based on information flow to and from the above-described I/O sensors. The HMI generally includes a touch screen that visually represents docking bay functions and can display docking bay status information based on data provided by the various I/O sensors mounted inside and outside the docking bay. Further, the touch screen comprising the HMI can enable the authorized user to operate the docking bay according to the data provided by the I/O sensors. FIGS. 6-15B illustrate exemplary embodiments of screens that may be displayed by way of the HMI touch screen during operation of the docking bay.

FIG. 6 illustrates an exemplary embodiment of a main screen 600 that may be displayed to an authorized user that has successfully logged into the HMI system. The main screen 600 enables operation of a specific docking bay identified in a docking bay identifier bar 604 disposed at the top of the screen 600. In the illustrated embodiment of FIG. 6, an indicator 608 disposed next to the docking bay identifier 604 can indicate that the docking bay is in communication with the automated PLC system. A status bar 612 disposed at the top of the screen 600 may be configured to display the current date and time, as well as the status of the load, during which the docking bay is being operated. A bottom portion 610 of the screen 600 can display an identification number of the trailer 312 currently being loaded, as well as displaying the current condition of the outside signal lights 156 of the docking bay, as described hereinabove.

With continuing reference to FIG. 6, the screen 600 may include an automation mode button 616 that enables the docking bay to be switched between Auto Mode and Manual Mode. As will be appreciated, the docking bay represented in FIG. 6 is currently set to Manual Mode wherein an authorized user may manually operate the docking bay. For example, a restraint control portion 620 comprising the screen 600 may enable manual operation of the vehicle restraint system 116. A Lock button 624 can facilitate locking the vehicle restraint system 116, and an Unlock button 628 enables the vehicle restraint system 116 to be manually unlocked. An icon 632 can indicate the status of the vehicle restraint system 116. As shown in FIG. 6, when the vehicle restraint system 116 is locked, the icon 632 may be displayed as a padlock.

The screen 600, as depicted in the embodiment of FIG. 6, further comprises a dock door control portion 636 and a dock leveler control portion 640. The dock door control portion 636 may facilitate manually operating the overhead door 104. An Open button 644 can enable the overhead door 104 to be opened, and a Stop button 648 enables movement of the overhead door 104 to be halted. A Close button 652 may enable the overhead door 104 to be manually closed. The dock leveler control portion 640 may further enable an operator to manually control the dock leveler 108. An Activate button 656 can enable the leveler 108 to be lifted and lowered. The Activate button 656 may further facilitate the lip of the leveler 108 extending, as well as enabling the leveler 108 to be positioned and stored, as needed. A float button 660 can enable the operator to pause the elevation of the dock leveler 108 when needed.

In the exemplary embodiment illustrated in FIG. 6, the main screen 600 may include a trailer load control portion 664 that facilitates the operator manually controlling loading of the trailer 312. In some embodiments, the trailer load control portion 664 may be utilized after a shipment has been started by a shipping clerk and the trailer 312 is first docked in the docking bay. The trailer load control portion 664 typically includes an OK to Load button 668 and an Abort Load button 672. If during inspecting the trailer 312, the trailer is found to meet the requirement for being loaded, an operator such as a dock coordinator can press the OK to Load button 668 to send a signal that the trailer is ready to be loaded. If the inspection of the trailer 312 fails, however, the dock coordinator can press the Abort Load button 672 to indicate that the trailer 312 is not ready for loading.

FIG. 7A illustrates an exemplary embodiment of a message list 776 that may be displayed on the screen 700 when the Abort Load button 772 is pressed. The message list 776 can generally include a multiplicity of potential reasons for aborting loading the trailer 312. The potential reasons 778 for not loading the trailer 312 generally relate to improper positioning of the trailer 312 in the docking bay and potential instability of the floor 112. It is contemplated that when the dock coordinator selects a potential reason 778 on the message list 776, a text message is immediately sent to a mobile device in the possession of the truck driver. As such, the message list 776 may enable the dock coordinator to communicate directly with the truck driver, without other personnel having to convey messages therebetween.

FIG. 7B illustrates an exemplary embodiment of a tribar menu 780 that may be displayed when an operator presses on a tribar menu button 782 displayed on the main screen 700. In the illustrated embodiment, the tribar menu 780 may include a Dock Control button 784, a Dock Status button 786, an Analytics button 788, an Event Log button 790, a Sensor Raw Data button 792, a Controller I/O button 794, a Calibration Values button 796, and an Exit button 798. The Dock Control button 784 enables the operator to access controls whereby the docking bay may be operated automatically or manually as described hereinabove. The Exit button 798 can enable the tribar menu 780 to be canceled, allowing the operator to return to the main screen 700. Buttons 786-796 are discussed herein below in greater detail.

Figure 8:
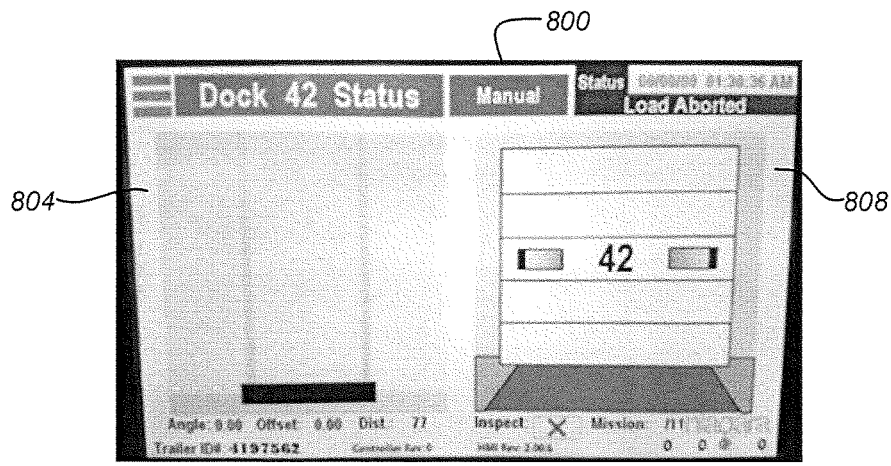
FIG. 8 illustrates an exemplary embodiment of a dock status screen that may be displayed in a docking environment of a docking bay wherein a truck trailer is absent.

FIGS. 8-16 illustrate exemplary embodiments of dock status screens that may be displayed during various exemplary docking environments when the Dock Status button 786 is pressed. FIG. 8 illustrates an exemplary embodiment of a dock status screen 800 in absence of the trailer 312. The dock status screen 800 may include a dock status portion 804 and a dock door portion 808. As will be appreciated, the dock status portion 804 can depict a top view of the dock outside the overhead door 104. The dock door portion 808 may also depict an interior view of the overhead door 104. In the docking environment of FIG. 8, the dock door portion 808 can show that no trailer is present in the docking bay, and the dock door portion 808 shows that the overhead door 104 is closed.

Figure 8A:
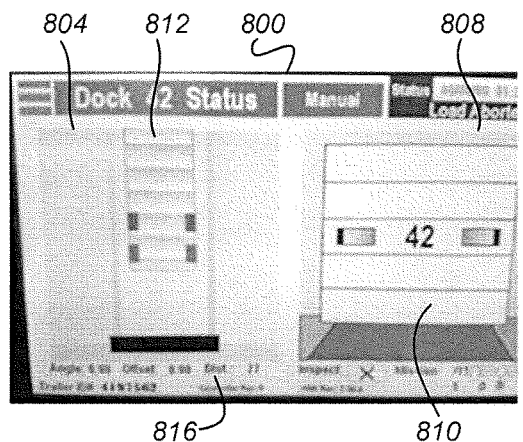
FIG. 8A illustrates the dock status screen of FIG. 8 in a docking environment wherein the truck trailer is backing towards the docking bay.
Figure 8B:
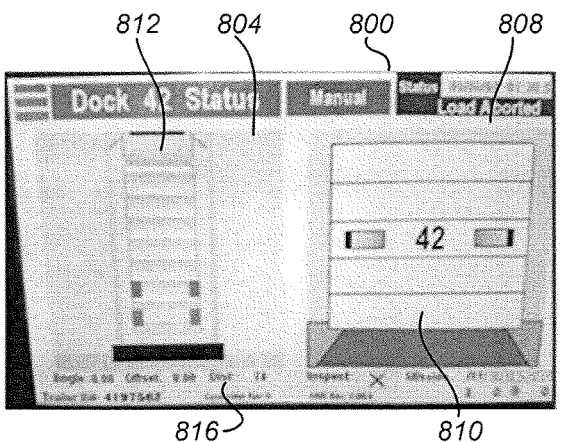
FIG. 8B illustrates a dock door portion of the dock status screen of FIG. 8, depicting an interior view of an overhead door of the docking bay.

FIGS. 8A-8B illustrate the dock status screen 800 in a docking environment wherein the trailer 312 is backing towards the docking bay. As such, an approaching trailer image 812 can be shown in the dock status portion 804. The distance between the rear of the trailer 312 and the dock can be displayed in a distance indicator 816 below the dock status portion 804. As will be appreciated, the distance indicator 816 shows a decreasing distance value as the trailer 312 backs into the dock. As shown in the dock door portion 808, a dock door image 810 is shown to indicate that the overhead door 104 remains closed while the trailer 312 approaches the docking bay.

Figure 9A:
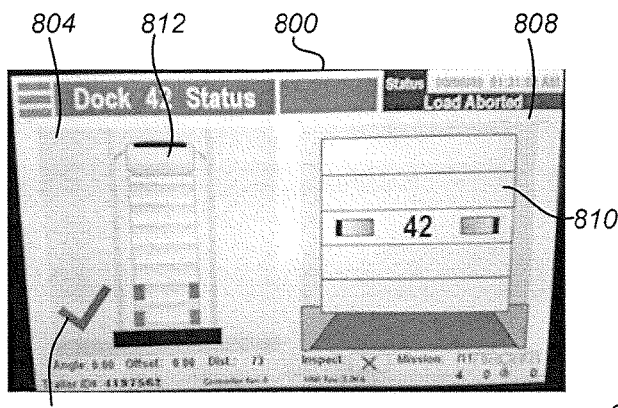
FIG. 9A illustrates an exemplary embodiment of the dock status screen of FIG. 8 that may be displayed in a docking environment wherein the truck trailer is properly aligned and docked at the docking bay.
Figure 9B:
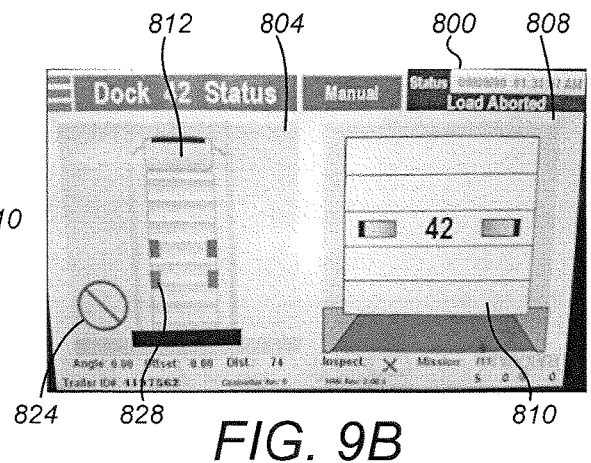
FIG. 9B illustrates the dock status screen of FIG. 9A in a docking environment wherein the truck trailer is improperly backed into the docking bay.

FIGS. 9A-9B illustrate the dock status screen 800 in docking environments wherein the trailer 312 can be finished backing into the docking bay. As shown in FIG. 9A, the dock status portion 804 may include green check mark 820 to indicate that the trailer 312 can be properly aligned and docked. In the dock status portion 804 shown in FIG. 9B, however, a red mark 824 can be displayed to indicate an improper docking of the trailer 312. Further, the dock status portion 804 shows trailer tandems 828 of the trailer 312 being displaced from the docking bay to indicate that the trailer 312 can be insufficiently backed into the dock. While the trailer 312 is incorrectly docked, the overhead door 104 remains closed, as indicated by the dock door image 810 in the dock door portion 808.

Figure 10A:
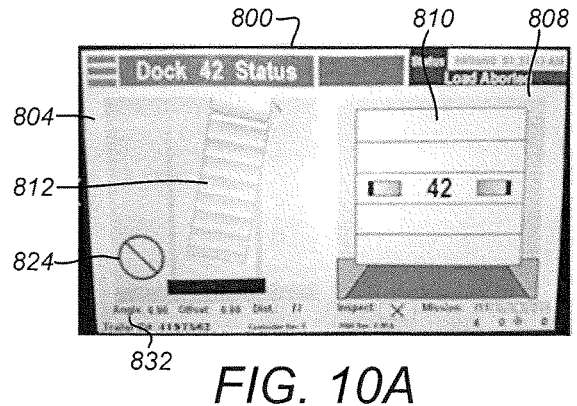
FIG. 10A illustrates an exemplary embodiment of the dock status screen of FIG. 8 that may be displayed in a docking environment wherein the truck trailer is misaligned towards a right-hand side of the docking bay.
Figure 10B:
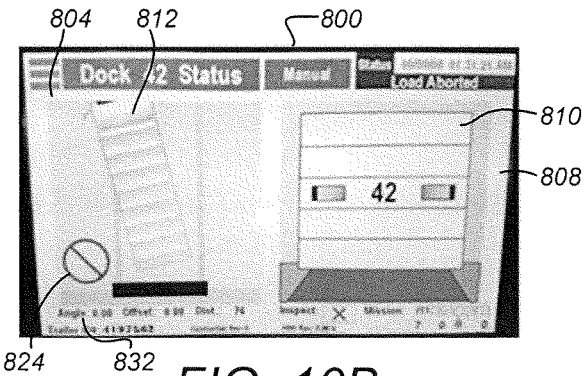
FIG. 10B illustrates an exemplary embodiment of the dock status screen of FIG. 8 that may be displayed in a docking environment wherein the truck trailer is misaligned towards a left-hand side of the docking bay.

FIGS. 10A-10B illustrate the dock status screen 800 in docking environments wherein the trailer 312 can be misaligned in the docking bay. In FIG. 10A, the dock status portion 804 shows the trailer 312 may be angled towards the right-hand side of the dock, and in FIG. 10B the dock status portion 804 shows the trailer 312 can be angled towards the left-hand side of the dock. In both FIGS. 10A and 10B, the dock status portion 804 may include the red mark 824 to indicate that the trailer 312 is improperly docked. The dock status portion 804 may include an angle value indicator 832 that can be configured to display specific angle values of misalignment of the trailer 312 with respect to the docking bay. Further, the dock door portion 808 may include the dock door image 810 to indicate that the overhead door 104 remains closed while the trailer 312 is misaligned with the docking bay.

Figure 11A:
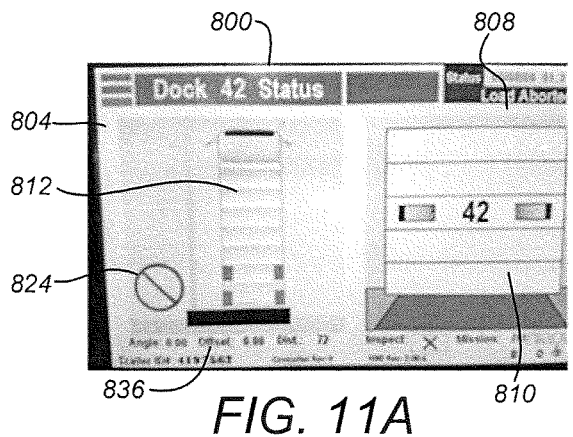
FIG. 11A illustrates an exemplary embodiment of the dock status screen of FIG. 8 that may be displayed in a docking environment wherein the truck trailer is improperly offset toward a right-hand side of the docking bay.
Figure 11B:
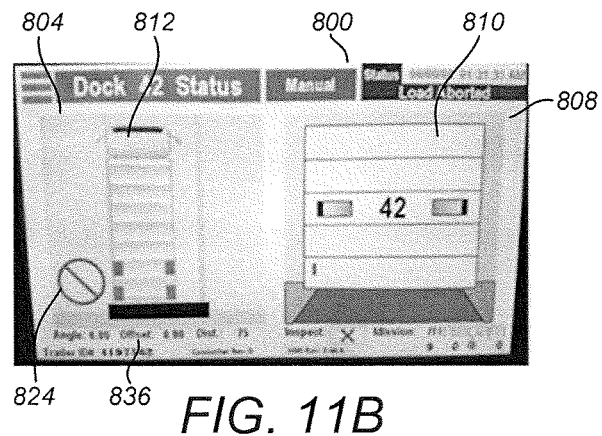
FIG. 11B illustrates an exemplary embodiment of the dock status screen of FIG. 8 that may be displayed in a docking environment wherein the truck trailer is improperly offset toward a left-hand side of the docking bay.

FIGS. 11A-11B illustrate the dock status screen 800 in docking environments wherein the trailer 312 can be offset in the docking bay. In FIG. 11A, the dock status portion 804 shows the trailer 312 can be offset towards the right-hand side of the dock, and in FIG. 10B the dock status portion 804 shows the trailer 312 is offset towards the left-hand side of the dock. The red mark 824 is shown in the dock status portion 804 of both of FIGS. 11A and 10B to indicate that the trailer 312 is improperly docked. The dock status portion 804 may include an offset value indicator 836 that can be configured to display specific offset distance values of the trailer 312 with respect to the docking bay. Further, the dock door portion 808 may include the dock door image 810 to indicate that the overhead door 104 remains closed while the trailer 312 is offset with respect to the docking bay.

Figure 12A:
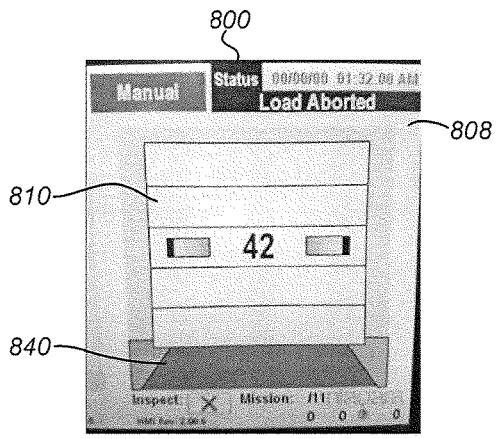
FIG. 12A illustrates an exemplary embodiment of a dock door portion of the dock status screen of FIG. 8 that may be displayed in a docking environment wherein an overhead door of the docking bay is closed.
Figure 12B:
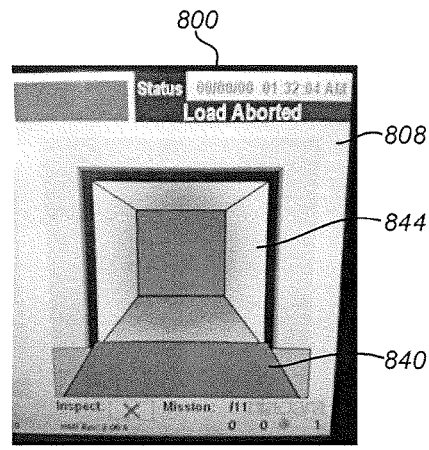
FIG. 12B illustrates an exemplary embodiment of a dock door portion of the dock status screen of FIG. 8 that may be displayed in a docking environment wherein the truck trailer is correctly docked, the overhead door is open, and a dock leveler is stored.
Figure 12C:
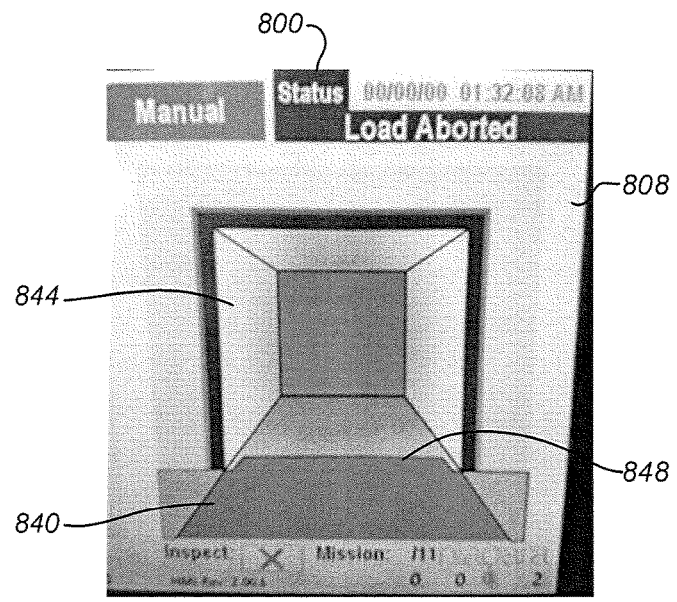
FIG. 12C illustrates an exemplary embodiment of a dock door portion of the dock status screen of FIG. 8 that may be displayed in a docking environment wherein the truck trailer is correctly docked, the overhead door is open, the dock leveler is engaged, and a lip of the dock leveler is extended to the truck trailer.

FIGS. 12A-12C illustrate the dock door portion 808 of the dock status screen 800 in docking environments wherein the trailer 312 can be correctly docked and the dock leveler 108 may be operated as described hereinabove. As shown in FIG. 12A, the dock door image 810 can be present to indicate that the overhead door 104 is closed. Below the dock door image 810 can be a leveler image 840 that indicates that the dock leveler 108 is currently stored. In FIG. 12B, the dock leveler 108 remains stored, as indicated by the leveler image 840, and the dock door image 810 can be replaced by an open-door image 844. As will be appreciated, the open-door image 844 indicates that the overhead door 104 is now opened. As shown in FIG. 12C, the open-door image 844 indicates that the overhead door 104 is open and a lip image 848 is shown extending into the interior of the trailer. The lip image 848 can be displayed to indicate that the dock leveler 108 is engaged and the lip is extended to the trailer 312.

Figures 13A, 13B:
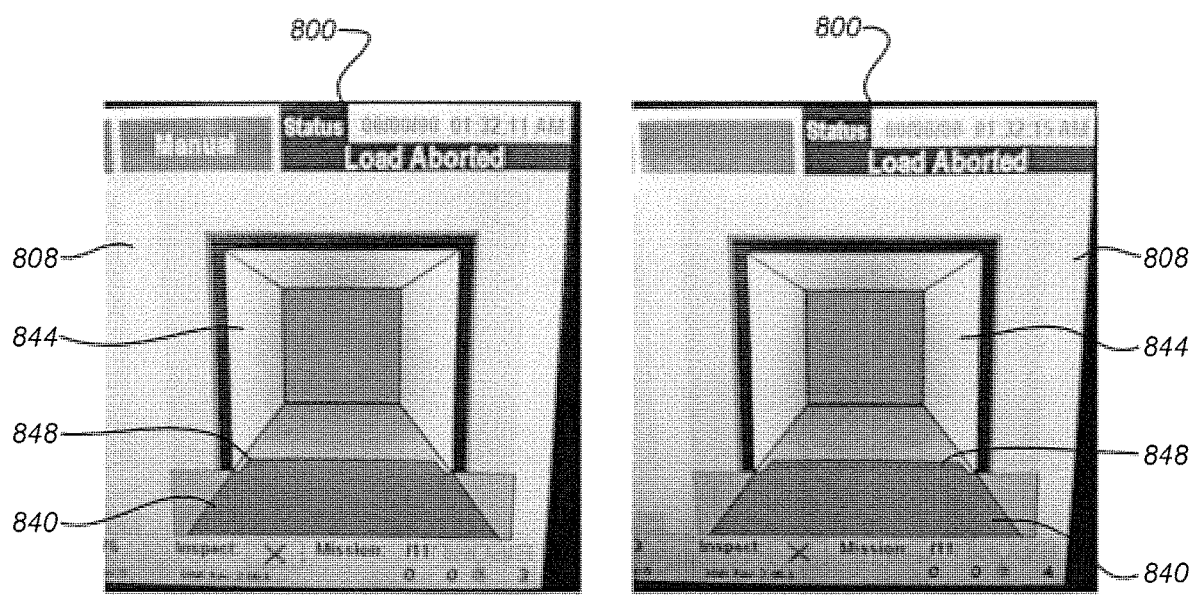
FIG. 13A illustrates an exemplary embodiment of a dock door portion of the dock status screen of FIG. 8 that may be displayed in a docking environment wherein the presence of one or more objects have been detected on the dock leveler.
FIG. 13B illustrates an exemplary embodiment of a dock door portion of the dock status screen of FIG. 8 that may be displayed in a docking environment wherein the presence of one or more objects have been detected on the lip of the dock leveler.

FIGS. 13A-13B illustrate the dock door portion 808 of the dock status screen 800 in docking environments wherein the VS sensor 1920 has detected the presence of one or more objects remaining on the dock leveler 108 and/or the lip. FIG. 13A illustrates the leveler image 840 with a highlighted color to indicate that the VS sensor 1920 has detected the presence of an object on the dock leveler 108. FIG. 13B illustrates the lip image 848 to indicate that the VS sensor 1920 has detected the presence of an object on the extended lip.

Figure 14A:
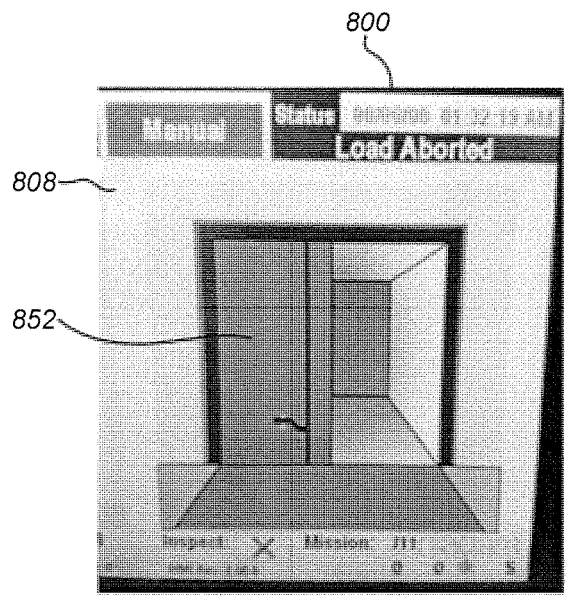
FIG. 14A illustrates an exemplary embodiment of a dock door status portion of the dock status screen of FIG. 8 that may be displayed in a docking environment wherein a closed left trailer door is detected.
Figure 14B:
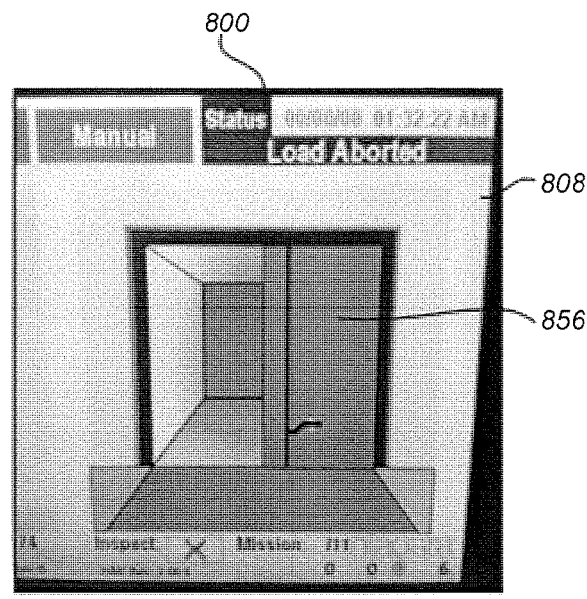
FIG. 14B illustrates an exemplary embodiment of a dock door status portion of the dock status screen of FIG. 8 that may be displayed in a docking environment wherein a closed right trailer door is detected.
Figure 14C:
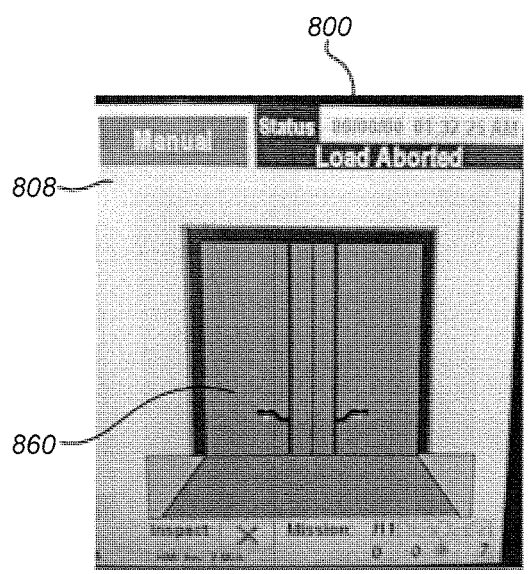
FIG. 14C illustrates an exemplary embodiment of a dock door status portion of the dock status screen of FIG. 8 that may be displayed in a docking environment wherein closed trailer doors are detected.
Figure 14D:
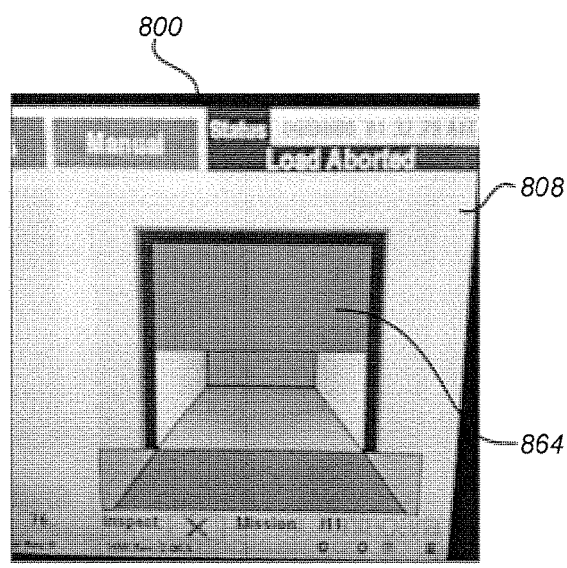
FIG. 14D illustrates an exemplary embodiment of a dock door status portion of the dock status screen of FIG. 8 that may be displayed in a docking environment wherein a partially closed trailer roll-up door is detected.

FIGS. 14A-14C illustrate the dock door portion 808 of the dock status screen 800 in docking environments wherein the VS sensor 1920 has detected improperly opened trailer 312 doors. The dock door portion 808, as shown in FIG. 14A, illustrates a closed left trailer door image 852 to indicate that the VS sensor 1920 has detected that the left trailer 312 door is not open. FIG. 14B shows the dock door portion 808 displaying a closed right trailer door image 856 to indicate that the VS sensor 1920 has detected that the right trailer 312 door is closed. When the VS sensor 1920 detects that both left and right trailer 312 doors are closed, the dock door portion 808 can display a both trailer doors closed image 860 as shown in FIG. 14C. Similarly, when the VS sensor 1920 detects that a roll-up door of the trailer 312 is not fully open, the dock door portion 808 can display a partially-open door image 864 as shown in FIG. 14D. As will be appreciated, all of the docking environments shown in FIGS. 14A-14C cause loading and unloading of the trailer 312 to be aborted.

Figures 15A, 15B:
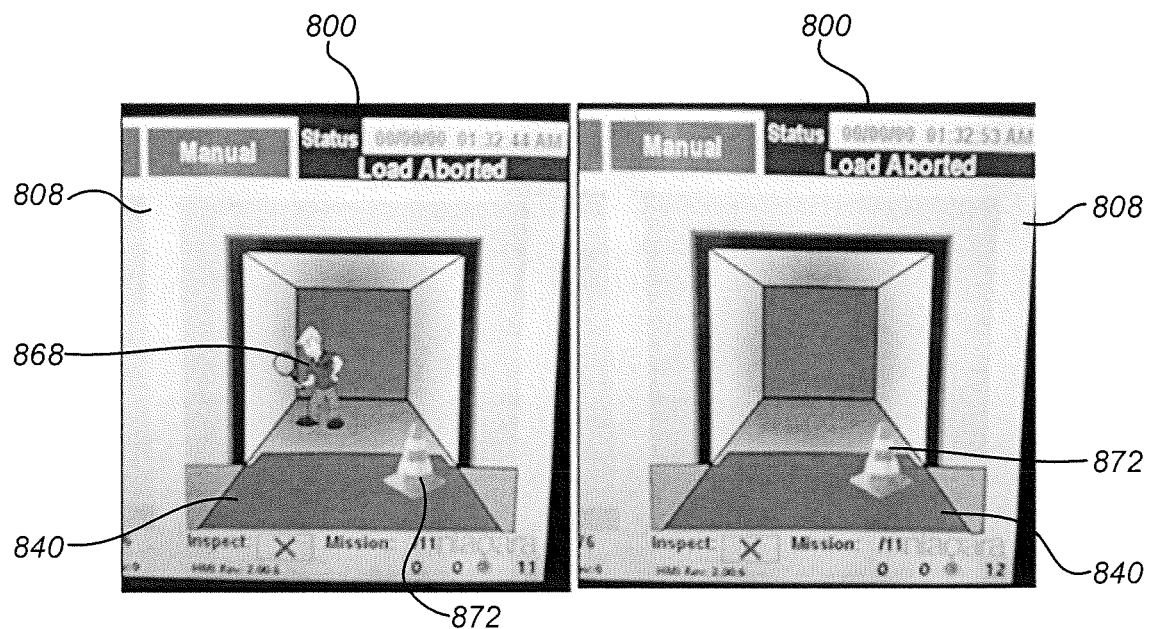
FIG. 15A illustrates an exemplary embodiment of a dock door portion of the dock status screen of FIG. 8 that may be displayed in a docking environment wherein a person has been detected inside the truck trailer.
FIG. 15B illustrates an exemplary embodiment of a dock door portion of the dock status screen of FIG. 8 that may be displayed in a docking environment wherein an object has been detected on the dock leveler.

FIGS. 15A-15B illustrate the dock door portion 808 of the dock status screen 800 in docking environments wherein the VS sensor 1920 has detected the presence of objects and people inside the trailer 312, causing loading of the trailer to be aborted. FIG. 15A illustrates the dock door portion 808 including person image 868 and an object image 872 to indicate that the VS sensor 1920 detected a person inside the trailer 312 and an object on the dock leveler 108. FIG. 15B illustrates the object image 872 overlaying the leveler image 840 to indicate that the VS sensor 1920 has detected the presence of an object on the dock leveler 108. Both of the docking environments shown in FIGS. 15A-15B cause loading of the trailer 312 to be aborted until the trailer 312 and the dock leveler 108 are cleared of people and objects.

Figure 16:
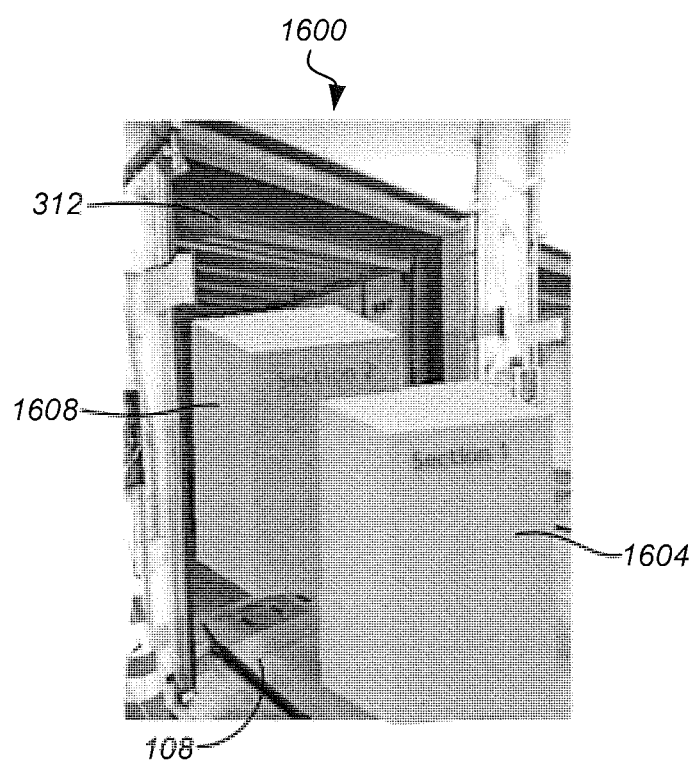
FIG. 16 illustrates an exemplary embodiment of a docking bay that includes sections wherein movement may be detected to determine the presence of personnel remaining within a truck trailer.

FIG. 16 illustrates an exemplary embodiment of a docking bay 1600 including a first section 1604 and a second section 1608 wherein movement may be detected by way of the VS sensor 1920. In the illustrated embodiment, the first section 1604 is disposed on the dock leveler 108 and the second section 1608 can be inside the trailer 312. In a first docking environment, the VS sensor 1920 may detect movement within the first section 1604 followed by detected movement within the second section 1608. In a second docking environment, the VS sensor 1920 may detect movement within the second section 1608 followed by detected movement within the first section 1604. As will be appreciated, the first docking environment indicates that a person has entered the trailer 312, whereas the second docking environment indicates that the person has exited the trailer 312. When the VS sensor 1920 detects the first docking environment, loading of the trailer 312 can be halted until the second docking environment is detected.

Figure 17:
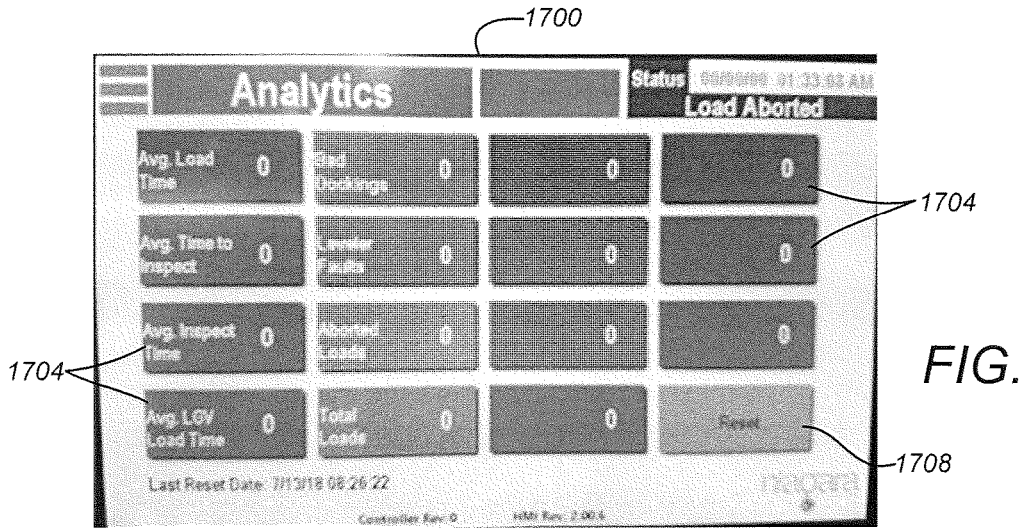
FIG. 17 illustrates an exemplary embodiment of an analytics screen that may be accessed by way of a tribar menu disposed on the main screen of FIG. 8.

FIG. 17 illustrates an exemplary embodiment of an analytics screen 1700 that may be accessed by way of the Analytics button 788 of the tribar menu 780, discussed in connection with FIG. 7B. The analytics screen 1700 may include a multiplicity of data slots 1704 that are configured to display specific values pertaining to the operation of the docking bay, such as the docking bays 100, 200. The data slots 1704 may contain any of various types of data, as desired, such as average load time, average time to inspect trailer, average LGV load time, number of bad dockings, number of leveler faults, number of aborted loads, number of total loads, and the like. It is contemplated that the data slots 1704 may be displayed with different colors to bring attention to different values contained with the slots. For example, faults may be displayed in red, while time data may be displayed in dark blue color, and numbers of types of loads may be displayed in light blue. Further, a Reset button 1708 is included on the analytics screen 1700 to enable an operator to return the values in the data slots 1704 to zero.

Figure 18:
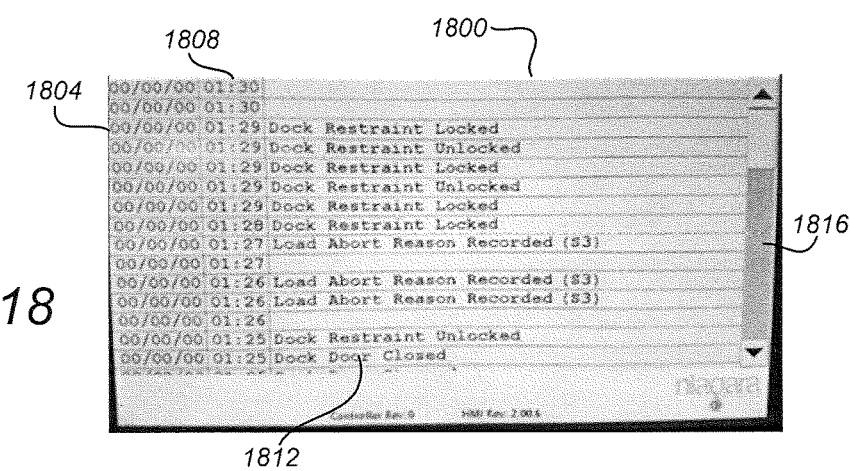
FIG. 18 illustrates an exemplary embodiment of an event log screen that may be accessed by way of the tribar menu disposed on the main screen of FIG. 8.

FIG. 18 illustrates an exemplary embodiment of an event log screen 1800 that may be accessed by way of the Event Log button 790 of the tribar menu 780, discussed in connection with FIG. 7B. As will be recognized, the event log screen 1800 may include a date column 1804, a time column 1808, and a description column 1812. As such, the event log screen 1800 can display a date, time and description of all operations performed by way of the HMI touch screen during operation of the docking bay. For example, in some embodiments, the event log screen 1800 can display all touch inputs performed by way of the main screen 700. A scroll bar 1816 along the right-hand side of the event log screen 1800 can be configured to enable an operator to scroll through the events displayed in the event log screen 1800.

Figure 19:
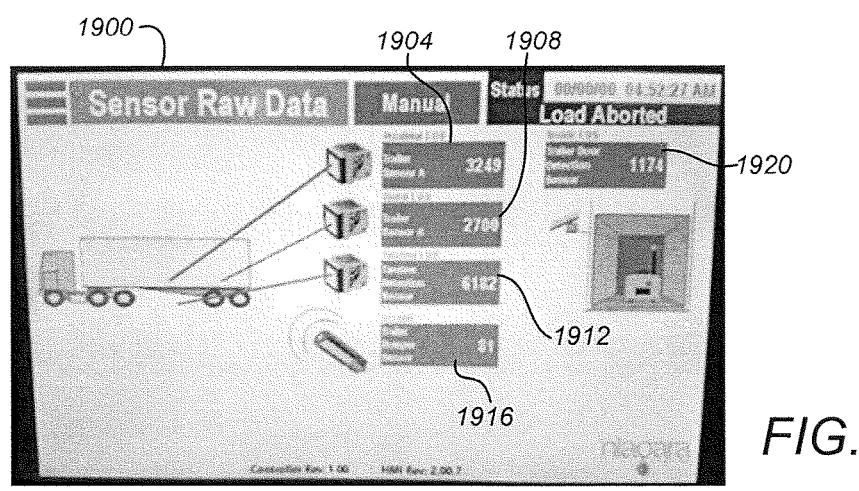
FIG. 19 illustrates an exemplary embodiment of a sensor raw data screen that may be accessed by way of the tribar menu disposed on the main screen of FIG. 8.

FIG. 19 illustrates an exemplary embodiment of a sensor raw data screen 1900 that may be accessed by way of the Sensor Raw Data button 792 of the tribar menu 780, discussed with respect to FIG. 7B. The sensor raw data screen 1900 can display raw sensor data pertaining to alignment and detection of the trailer 312 for both the interior and exterior of the docking bay. As shown in FIG. 19, the two above-mentioned exterior LDS sensors configured to detect alignment of the trailer 312 are indicated by Trailer Sensor A 1904 and Trailer Sensor B 1908. The third exterior LDS sensor configured to detect the position of the trailer tandem can be indicated by Tandem Detection Sensor 1912. Further, the single ultrasonic sensor configured to measure the distance between dock door and the rearmost portion of trailer 312 can be indicated by Trailer Bumper Sensor 1916. The VS sensor and the interior of the docking bay can be indicated by Trailer Door Detection Sensor 1920. In some embodiments, the values displayed in the sensor raw data screen 1900 may be used for calibration purposes and for calculating the status of the trailer 312 at the docking bay door.

Figure 20A:
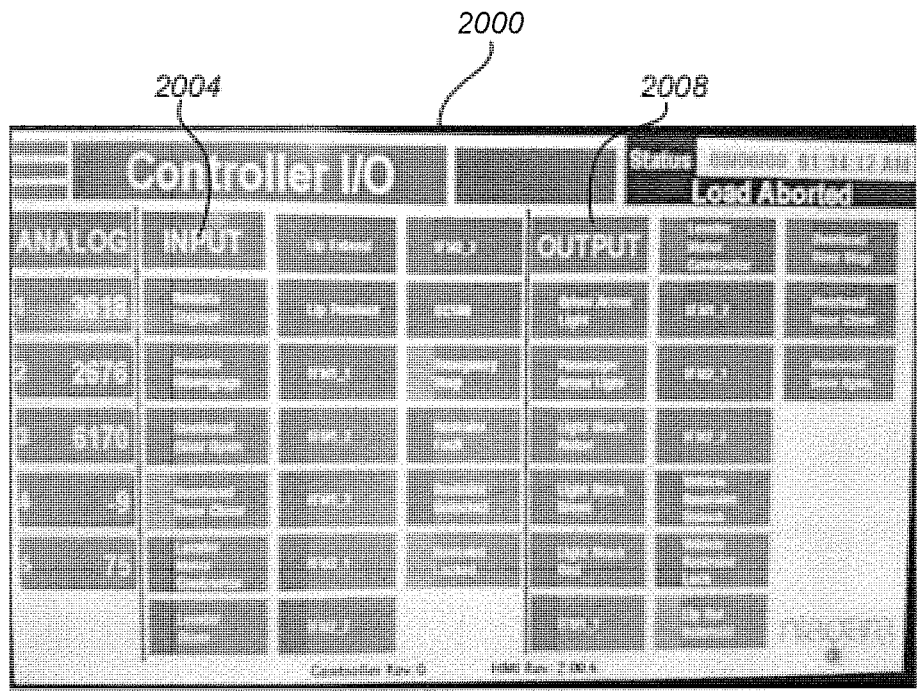
FIG. 20A illustrates an exemplary controller I/O screen that may be accessed by way of the tribar menu disposed on the main screen of FIG. 8.
Figure 20B:
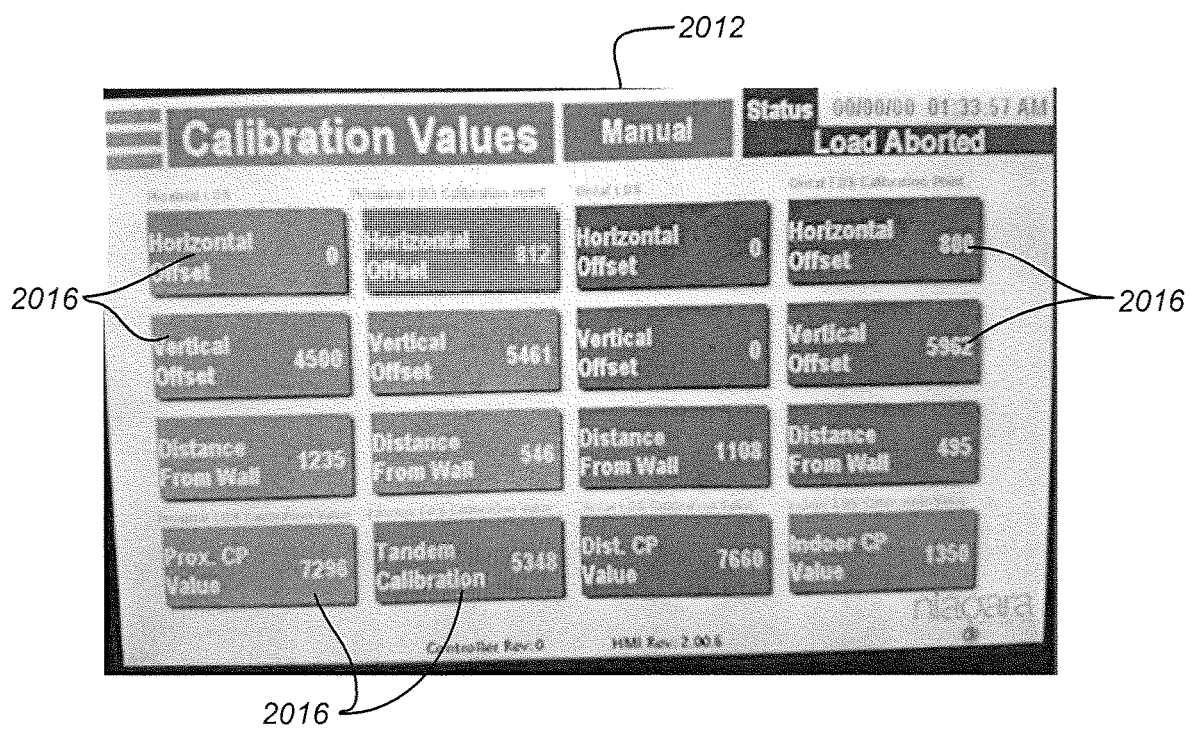
FIG. 20B illustrates an exemplary calibration values screen that may be accessed by way of the tribar menu disposed on the main screen of FIG. 8.

FIGS. 20A-20B illustrate exemplary embodiments of screens that may be accessed for testing purposes by authorized personnel, such as, by way of non-limiting example, a programmer. FIG. 20A illustrates an exemplary controller I/O screen 2000 that may be accessed by way of the Controller I/O button 794 of the above-described tribar menu 780. The controller I/O screen 2000 may include a multiplicity of data inputs 2004 and data outputs 2008 pertaining to the operation of the docking bay, such as the docking bays 100, 200. FIG. 20B illustrates an exemplary calibration values screen 2012 that may be accessed by way of the Calibrated Values button 796 of the tribar menu 780, as shown in FIG. 7B. The calibration values screen 2012 may include a multiplicity of distance data slots 2016 whereby the various sensors comprising the docking bay may be calibrated. As will be recognized by those skilled in the art, the screens 2000 and 2012 comprise an interface whereby calibration and testing tasks may be performed.

Figure 21:
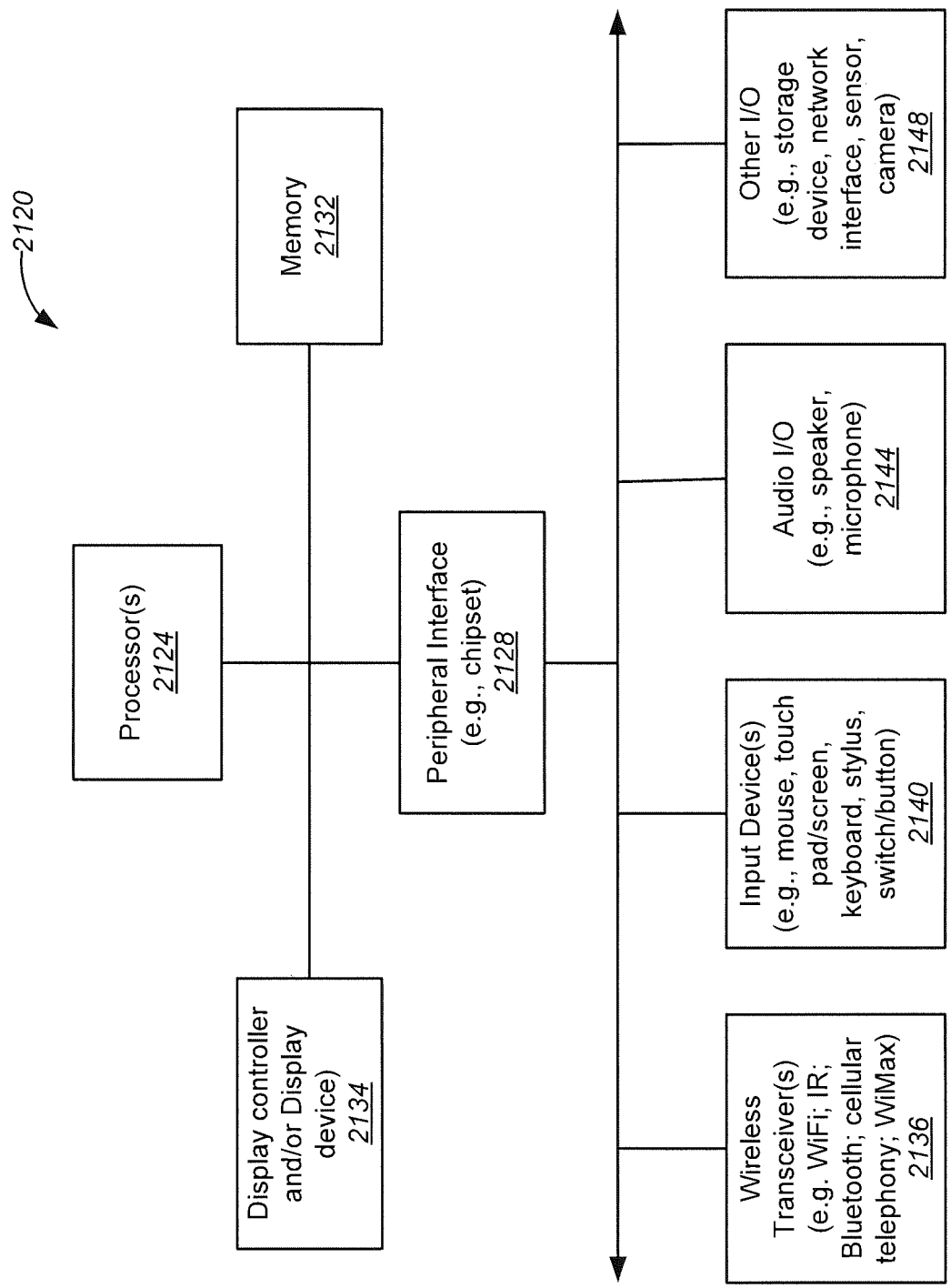
FIG. 21 is a block diagram illustrating an exemplary data processing system that may be used with an automated docking bay according to the present disclosure.

FIG. 21 is a block diagram illustrating an exemplary data processing system 2120 that may be used with an automated docking bay, such as the docking bays 100, 200, to perform any of the processes or methods described herein. System 2120 may represent a desktop, a tablet, a server, a mobile phone, a media player, a personal digital assistant (PDA), a personal communicator, a network router or hub, a wireless access point (AP) or repeater, a set-top box, or a combination thereof.

In an embodiment, illustrated in FIG. 21, system 2120 may include a processor 2124 and a peripheral interface 2128, also referred to as a chipset, to couple various components to the processor 2124, including a memory 2132 and devices 2136-2148 by way of a bus or an interconnect. Processor 2124 may represent a single processor or multiple processors with a single processor core or multiple processor cores included therein. Processor 2124 may represent one or more general-purpose processors such as a microprocessor, a central processing unit (CPU), and the like. More particularly, processor 2124 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 2124 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 2124 can be configured to execute instructions for performing the operations and steps discussed herein.

Peripheral interface 2128 may include a memory control hub (MCH) and an input output control hub (ICH). Peripheral interface 2128 may include a memory controller (not shown) that communicates with a memory 2132. The peripheral interface 2128 may also include a graphics interface that communicates with graphics subsystem 2134, which may include a display controller and/or a display device. The peripheral interface 2128 may communicate with the graphics device 2134 by way of an accelerated graphics port (AGP), a peripheral component interconnect (PCI) express bus, or any other type of interconnects.

An MCH is sometimes referred to as a Northbridge, and an ICH can sometimes be referred to as a Southbridge. As used herein, the terms MCH, ICH, Northbridge and Southbridge are intended to be interpreted broadly to cover various chips that perform functions including passing interrupt signals toward a processor. In some embodiments, the MCH may be integrated with the processor 2124. In such a configuration, the peripheral interface 2128 operates as an interface chip performing some functions of the MCH and ICH. Furthermore, a graphics accelerator may be integrated within the MCH or the processor 2124.

Memory 2132 may include one or more volatile storage (or memory) devices, such as random access memory (RAM), dynamic RAM (DRAM), synchronous DRAM (SDRAM), static RAM (SRAM), or other types of storage devices. Memory 2132 may store information including sequences of instructions that are executed by the processor 2124, or any other device. For example, executable code and/or data of a variety of operating systems, device drivers, firmware (e.g., input output basic system or BIOS), and/or applications can be loaded in memory 2132 and executed by the processor 2124. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 2128 may provide an interface to I/O devices, such as the devices 2136-2148, including wireless transceiver(s) 2136, input device(s) 2140, audio I/O device(s) 2144, and other I/O devices 2148. Wireless transceiver 2136 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 2140 may include a mouse, a touch pad, a touch sensitive screen (which may be integrated with display device 2134), a pointer device such as a stylus, and/or a keyboard (e.g., physical keyboard or a virtual keyboard displayed as part of a touch sensitive screen). For example, the input device 2140 may include a touch screen controller coupled with a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio I/O 2144 may include a speaker and/or a microphone to facilitate voice-enabled functions, such as voice recognition, voice replication, digital recording, and/or telephony functions. Other optional devices 2148 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 2148 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 21 illustrates various components of a data processing system, it is not intended to represent any particular architecture or manner of interconnecting the components; as such details are not germane to embodiments of the present disclosure. It should also be appreciated that network computers, handheld computers, mobile phones, and other data processing systems, which have fewer components or perhaps more components, may also be used with embodiments of the invention disclosed hereinabove.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it should be appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. An automated docking bay for servicing a truck trailer, the docking bay comprising:
   a programmable logic controller system configured to operate the docking bay;
   a plurality of sensors configured to detect an orientation of the truck trailer with respect to the docking bay;
   an outside lighting system configured to provide feedback to a truck driver during backing the truck trailer into the docking bay;
   a vehicle restraint system configured to fixate the truck trailer within the docking bay;
   an overhead door configured to open once the truck trailer is fixated by the vehicle restraint system;
   a dock leveler configured to deploy after the overhead door opens; and
   a human machine interface system in communication with the programmable logic controller system and the plurality of sensors.

2. The docking bay of claim 1, wherein the plurality of sensors comprises:
   a first sensor and a second sensor to detect an angle and an offset of the truck trailer within the docking bay;
   a third sensor to detect a position of a tandem of the truck trailer;
   a fourth sensor to detect a distance between a wall of the docking bay and a rearmost portion of the truck trailer; and
   a fifth sensor to observe the status of an interior of the docking bay.

3. The docking bay of claim 2, wherein the first sensor and the second sensor are laser distance sensors mounted to a side of the docking bay by way of a bracket.

4. The docking bay of claim 3, wherein the third sensor is a laser distance sensor mounted to the docking bay by way of the bracket.

5. The docking bay of claim 2, wherein the fourth sensor is an ultrasonic sensor that is recessed behind the vehicle restraint system.

6. The docking bay of claim 5, wherein the vehicle restraint system engages the truck trailer after the truck trailer is properly positioned within the docking bay.

7. The docking bay of claim 6, wherein the overhead door may be opened and the dock leveler may be deployed after the vehicle restraint system successfully engages the truck trailer.

8. The docking bay of claim 2, wherein the fifth sensor is a vision sensor configured for recognition and assessment of objects in the interior of the docking bay.

9. The docking bay of claim 8, wherein the fifth sensor is configured to detect obstructions located near or on the dock leveler during lifting and lowering of the overhead door.

10. The docking bay of claim 8, wherein the fifth sensor is configured to determine whether the height of the truck trailer is proper based on communications with the programmable logic controller system.

11. The docking bay of claim 8, wherein the fifth sensor is configured to detect the presence of improperly opened truck trailer doors.

12. The docking bay of claim 11, wherein the dock leveler is deployed after the overhead door is opened and the truck trailer doors are detected to be properly opened.

13. The docking bay of claim 1, wherein the human machine interface is configured to enable an authorized user to operate the docking bay based on information flow to and from the plurality of sensors.

14. The docking bay of claim 13, wherein the human machine interface includes a touch screen configured to visually represent docking bay functions.

15. The docking bay of claim 14, wherein the touch screen is configured to display docking bay status information based on data provided by the plurality of sensors.

16. The docking bay of claim 15, wherein the human machine interface is configured to enable the authorized user to operate the docking bay by way of the touch screen according to the docking bay status information.

17. The docking bay of claim 16, wherein the human machine interface is configured to enable the authorized user to switch the operation of the docking bay between an automation mode and a manual mode.

18. The docking bay of claim 16, wherein the human machine interface is configured to provide an interface whereby calibration and testing tasks may be performed.

19. The docking bay of claim 16, wherein the human machine interface is configured to display sensor raw data whereby calibration and testing tasks may be performed.

20. The docking bay of claim 1, wherein the human machine interface is separate and distinct from the programmable logic controller system and the plurality of sensors.

* * * * *